(12) United States Patent
Ono et al.

(10) Patent No.: US 11,788,598 B2
(45) Date of Patent: Oct. 17, 2023

(54) SHOCK ABSORBER

(71) Applicant: AISIN CORPORATION, Kariya (JP)

(72) Inventors: Hisashi Ono, Kariya (JP); Katsuhiko Takasu, Kariya (JP); Satoshi Komatsu, Kariya (JP)

(73) Assignee: AISIN CORPORATION, Aichi (JP)

( * ) Notice: Subject to any disclaimer, the term of this patent is extended or adjusted under 35 U.S.C. 154(b) by 1007 days.

(21) Appl. No.: 16/683,811

(22) Filed: Nov. 14, 2019

(65) Prior Publication Data

US 2020/0158202 A1 May 21, 2020

(30) Foreign Application Priority Data

| Nov. 16, 2018 | (JP) | 2018-215637 |
| Nov. 16, 2018 | (JP) | 2018-215638 |
| Aug. 23, 2019 | (JP) | 2019-152632 |

(51) Int. Cl.
*F16F 9/19* (2006.01)
*F01C 13/00* (2006.01)
*F16F 9/53* (2006.01)

(52) U.S. Cl.
CPC ............... *F16F 9/19* (2013.01); *F01C 13/00* (2013.01); *F16F 9/53* (2013.01)

(58) Field of Classification Search
CPC ............ F16F 9/19; F16F 9/53; F01C 13/00
See application file for complete search history.

(56) References Cited

U.S. PATENT DOCUMENTS 5,190,447 A * 3/1993 Schneider ............... F04B 17/03
417/270
5,215,327 A 6/1993 Gatter et al.
(Continued)

FOREIGN PATENT DOCUMENTS

| DE | 10213156 A1 | 10/2003 |
| JP | 3123981 U | 12/1991 |

(Continued)

OTHER PUBLICATIONS

Office Action (Notice of Reasons for Refusal) dated Jul. 4, 2022, by the Japanese Patent Office in corresponding Japanese Patent Application No. 2018-215637 and an English Translation of the Office Action. (8 pages).

(Continued)

*Primary Examiner* — Vishal R Sahni
(74) *Attorney, Agent, or Firm* — BUCHANAN INGERSOLL & ROONEY PC

(57) ABSTRACT

A shock absorber includes: a cylinder accommodating a fluid; a piston that reciprocates with respect to the cylinder while partitioning an inside of the cylinder into a first fluid chamber and a second fluid chamber; a pump having a first port that communicates with either one of the first fluid chamber and the second fluid chamber and a second port that communicates with the other one of the first fluid chamber and the second fluid chamber, and including a flow rate change portion that changes a circulation amount of the fluid circulating between the first port and the second port; an electric rotor rotating in conjunction with the pump; and a stator forming a magnetic field between the electric rotor and the stator.

9 Claims, 11 Drawing Sheets

(56) References Cited

U.S. PATENT DOCUMENTS

| | | | |
|---|---|---|---|
| 6,217,296 B1* | 4/2001 | Miyazawa | F04C 14/226 417/220 |
| 8,376,100 B2* | 2/2013 | Avadhany | B60G 13/14 180/165 |
| 8,966,889 B2* | 3/2015 | Six | F15B 1/04 60/413 |
| 9,035,477 B2 | 5/2015 | Tucker et al. | |
| 9,260,011 B2* | 2/2016 | Anderson | B60K 25/10 |
| 9,689,382 B2 | 6/2017 | Tucker et al. | |
| 9,879,744 B2* | 1/2018 | Haller | F16F 9/46 |
| 10,125,841 B2* | 11/2018 | Coombs | F16F 9/5165 |
| 10,434,835 B2* | 10/2019 | Six | F15B 13/027 |
| 10,875,375 B2* | 12/2020 | Giovanardi | F16F 15/002 |
| 10,954,935 B2* | 3/2021 | O'Shea | F04B 49/20 |
| 11,072,220 B2* | 7/2021 | Conti | B60G 17/08 |
| 11,440,366 B1* | 9/2022 | O'Shea | B60G 17/08 |
| 2010/0072760 A1* | 3/2010 | Anderson | F03G 7/08 290/1 R |
| 2013/0147205 A1* | 6/2013 | Tucker | B60G 11/265 290/1 A |
| 2015/0226216 A1* | 8/2015 | Mauser | F04C 14/223 418/16 |
| 2018/0298976 A1* | 10/2018 | Battlogg | F16F 9/12 |
| 2020/0158202 A1* | 5/2020 | Ono | F16F 9/19 |

FOREIGN PATENT DOCUMENTS

| | | | |
|---|---|---|---|
| JP | H04-228313 A | 8/1992 | |
| JP | 2009214836 A | 9/2009 | |
| JP | 5723445 B2 | 5/2015 | |
| JP | 2015-102101 A | 6/2015 | |
| JP | 6058057 B2 | 1/2017 | |
| WO | WO-2019114948 A1 * | 6/2019 | F04C 14/223 |

OTHER PUBLICATIONS

Extended European Search Report dated Mar. 31, 2020 issued by the European Patent Office in European Patent Application No. 19209543.8 (7 pages).

* cited by examiner

SHOCK ABSORBER

CROSS REFERENCE TO RELATED APPLICATIONS

This application is based on and claims priority under 35 U.S.C. § 119 to Japanese Patent Applications 2018-215637, 2018-215638 and 2019-152632, filed on Nov. 16, 2018, Nov. 16, 2018 and Aug. 23, 2019, respectively, the entire contents of which are incorporated herein by reference.

TECHNICAL FIELD

This disclosure relates to a shock absorber with an energy regenerative function and an extension and contraction operation function which uses a fluid and provides a variable cushioning effect.

BACKGROUND DISCUSSION

In the related art, for example, the following JP 2009-214836A (refer to paragraphs [0007] to [0012], and the like) discloses such shock absorber.

The shock absorber disclosed in JP 2009-214836A includes a main body housing and a piston housing which move relative to each other. The main body housing is provided with a screw member that rotates relative to the main body housing. The piston housing is provided with a nut member that screws with the screw member. If the piston housing moves upward and downward, the nut member which is integrally provided with the piston housing moves upward and downward, and the screw member is driven to rotate. A CVT mechanism is connected to the screw member, and the rotational speed of the screw member is transmitted to a motor unit via a belt member while being appropriately changed.

As described above, in the technique disclosed in JP 2009-214836A, a linear operation of the piston housing is converted into a rotational operation, the rotational operation is transmitted to the motor unit, and the rotational speed is appropriately changed at this time, and thus an operation load of the piston housing is changed, and the cushioning effect or the regeneration efficiency is controlled.

However, in the shock absorber disclosed in JP 2009-214836A, since the screw member is used as a power transmission mechanism, in long term use, the screw member wears down, and rattles among members occur. As the result of wear powder being formed, there occurs also a problem such as the smoothness of operation of the piston housing becoming worse.

In addition, as the result of the CVT mechanism being used, a speed changer mechanism for the transmission of rotation or the like becomes large, and the ease of mounting to various apparatuses becomes worse. Furthermore, in order to change the rotational speed, it is necessary to change and control the shape of at least one of pulleys engaging with a transmission belt, and an apparatus becomes complicated. Moreover, in addition to an increase in the weight of the apparatus, there occurs also a concern such as cost increase.

As a result, not only the responsiveness of the cushioning function of the shock absorber decreases, but also it becomes difficult to stably maintain the cushioning function. When the extension and contraction of the shock absorber is transmitted to the motor unit, a transmission loss occurs, and also the energy regeneration efficiency decreases. Since such energy consumption occurs also in power running control to drive the motor unit to rotate the screw member and control an extension and contraction state of the piston housing, also when vehicle height regulation of a suspension is performed, the responsiveness becomes worse.

In addition, in the apparatus disclosed in JP 2009-214836A, if an operation direction of the piston housing is changed, a rotational direction of the screw member is reversed. Namely, whenever the shock absorber switches between extension and contraction, the screw member and each part of the CVT member are required to reverse the rotational direction against a rotational inertia, and the responsiveness of the cushioning function becomes worse. Furthermore, due to the reverse operation, energy is consumed, and also the regeneration efficiency becomes worse. The reverse operation occurs also in the power running control to electrically rotate the motor unit to rotate the screw member via the CVT member and actively change the position of the piston housing.

Thus, a need exists for a shock absorber which is not susceptible to the drawback mentioned above.

SUMMARY

A feature of a shock absorber according to a first aspect of this disclosure (first configuration) resides in that the shock absorber includes a cylinder accommodating a fluid; a piston that reciprocates with respect to the cylinder while partitioning an inside of the cylinder into a first fluid chamber and a second fluid chamber; a pump having a first port that communicates with either one of the first fluid chamber and the second fluid chamber and a second port that communicates with the other one of the first fluid chamber and the second fluid chamber, and including a flow rate change portion that changes a circulation amount of the fluid circulating between the first port and the second port; an electric rotor rotating in conjunction with the pump; and a stator forming a magnetic field between the electric rotor and the stator.

BRIEF DESCRIPTION OF THE DRAWINGS

The foregoing and additional features and characteristics of this disclosure will become more apparent from the following detailed description considered with the reference to the accompanying drawings, wherein:

FIGS. 21A and 218 are description views illustrating a configuration of a pump according to the tenth embodiment;

FIGS. 23A and 238 are description views illustrating a configuration of an oil control valve according to the eleventh embodiment;

DETAILED DESCRIPTION

First Embodiment

Figure 1:
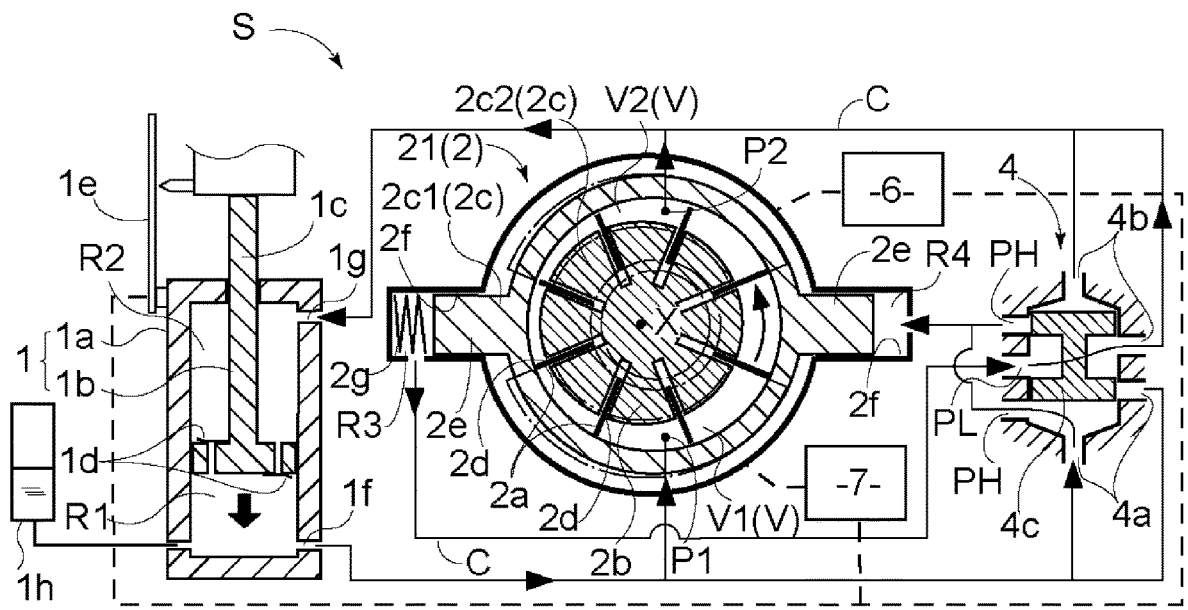
FIG. 1 is a description view illustrating a configuration and a regenerative operation of a shock absorber according to a first embodiment.

FIGS. 1 to 5 illustrate a shock absorber S according to a first embodiment. The shock absorber S disclosed here is used in, for example, a suspension of a vehicle. The shock absorber S has a cylinder 1a accommodating a working oil which is a fluid therein, and a piston 1b that reciprocates while partitioning the inside of the cylinder 1a into a first fluid chamber R1 and a second fluid chamber R2. An absorber main body 1 is formed of the cylinder 1a and the piston 1b. A pump 2 capable of changing the flow rate of the working oil is provided beside the cylinder 1a. Furthermore, the pump 2 is provided with a rotary armature 3 that operates in conjunction with operation members forming the pump 2. Accordingly, vehicle height regulation or the like is performed by regulating the operation speed of the piston 1b or actively operating the piston 1b.

Here, a vane pump 21 is used as an example of the pump 2. If the piston 1b reciprocates when the vehicle travels, the working oil flows in and out between the first fluid chamber R1 and the second fluid chamber R2. The working oil circulates through the vane pump 21, and if the circulation resistance of the vane pump 21 is changed, the movement of the piston 1b is relaxed.

In addition, the rotary armature 3 works such that the vane pump 21 serves as a fluid pressure motor for generating electric power or a fluid pressure pump for generating a fluid pressure. When the vane pump 21 serves as a fluid pressure motor, if the rotational speed of the vane pump 21 is changed, regeneration efficiency is changed. On the other hand, when the vane pump 21 serves as a fluid pressure pump, the position of the piston 1b is changed via the vane pump 21, and the vehicle height can be regulated.

Absorber Main Body

As illustrated in FIG. 1, the piston 1b having a rod 1c Is inserted into the cylinder 1a. The piston 1b partitions the inside of the cylinder 1a into the first fluid chamber R1 and the second fluid chamber R2. A first cylinder port 1f communicating with the first fluid chamber R1 and a second cylinder port 19 communicating with the second fluid chamber R2 are formed in a wall portion of the cylinder 1a.

The piston 1b is provided with a pair of one-way valves 1d that communicate with the first fluid chamber R1 and the second fluid chamber R2. If the vane pump 21 to be described later fails and the working oil is not capable of circulating between the first fluid chamber R1 and the second fluid chamber R2 via the vane pump 21, the one-way valves 1d work, and the piston 1b is reciprocatable.

For example, a fluid amount regulating portion 1h is provided outside the cylinder 1a, for example, in a state where the fluid amount regulating portion 1h communicates with the first fluid chamber R1. For example, when the piston 1b retreats with respect to the cylinder 1a, the volume ratio of the rod 1c inside the cylinder 1a is changed, and a fluid amount and a fluid pressure which are present in a flow path C of the entirety of the apparatus are changed. Since the fluid amount regulating portion 1h is provided such that the fluid is capable of flowing in and out therefrom in response to the change in fluid pressure at this time, the entire fluid pressure is maintained constant.

Vane Pump

As illustrated in FIG. 1, the vane pump 21 has a fluid rotor 2b as a rotation member which holds a plurality of vanes 2a, and a ring member 2c with which the vanes 2a come into contact. The vanes 2a are inserted into a plurality of groove portions 2d that are provided in a radial direction with respect to a rotation center X of the fluid rotor 2b. When the fluid rotor 2b rotates, the vanes 2a move out due to centrifugal forces, and slide against an inner surface of the ring member 2c.

The ring member 2c has an outer ring member 201 and an inner ring member 2c2. When the fluid rotor 2b rotates, usually, the vanes 2a move out due to centrifugal forces, and come into sliding contact with the outer ring member 2c1. On the other hand, if the rotational speed of the fluid rotor 2b slows down and sufficient centrifugal forces are not applied to the vanes 2a, or if foreign matters infiltrate the groove portions 2d of the fluid rotor 2b and there occurs resistance against the movement of the vanes 2a, the inner ring member 2c2 compulsively moves the vanes 2a toward the outer ring member 2c1.

The position of the ring member 2c can be changed by the working oil. The ring member 2c serves as a flow rate change portion that changes the flow rate of the working oil circulating through the vane pump 21. A pair of guide protrusions 2e are formed in the outer ring member 2c1 at positions opposite to each other. A pair of guide grooves 2f are formed in a main body of the vane pump 21. The guide protrusions 2e are inserted into the guide grooves 2f so as to be slidable in close contact therewith.

As Illustrated in FIG. 1, the guide protrusions 2e and the guide grooves 2f form a first pressure chamber R3 and a second pressure chamber R4 to which the oil pressure of the working oil is applied. The first pressure chamber R3 is provided with a biasing portion 2g which presses the outer ring member 2c1 such that a center of the outer ring member 2c1 becomes offset from the rotation center X of the fluid rotor 2b. The biasing portion 2g is, for example, a coil spring.

A plurality of pump chambers V which hold and transport the working oil are formed between the outer ring member 2c1 and the vanes 2a. The pump chamber V is formed of a first pump chamber V1 that communicates with the first fluid chamber R1 via a first port P1, and a second pump chamber V2 that communicates with the second fluid chamber R2 via a second port P2.

The larger the amount of offset of the outer ring member 2c1 with respect to the fluid rotor 2b becomes, the larger a change in the volume of the pump chamber V along with the rotation of the fluid rotor 2b becomes, and thus the flow rate of the vane pump 21 increases. In this embodiment, since the outer ring member 2c1 is normally biased by the biasing portion 2g, an initial state of the vane pump 21 is a state where the flow rate is the maximum. Namely, when the piston 1b moves quickly, since the working oil easily passes through the vane pump 21, the damping effect of the piston 1b is reduced. In addition, since a large amount of the working oil is capable of circulating through the vane pump 21, the number of rotations of the fluid rotor 2b is reduced. Therefore, also the rotational speed of the rotary armature 3 to be described later does not increase, and the regeneration effect is reduced.

First Valve

In order to enhance the damping effect when the piston 1b moves rapidly, it is necessary to reduce a change in the volume of the pump chamber V along with rotation by decreasing the amount of offset of the outer ring member 2c1. For this reason, in the first embodiment, a first valve 4 is provided as illustrated in FIG. 1.

The first valve 4 has two ports 4a connected to the first fluid chamber R1 and two ports 4b connected to the second fluid chamber R2, and include a valve body 4c thereinside. The valve body 4c displaces in response to a difference between the oil pressure of the first fluid chamber R1 and the oil pressure of the second fluid chamber R2, and between the first fluid chamber R1 and the second fluid chamber R2, one having a high oil pressure communicates with a high pressure port PH, and one having a low oil pressure communicates with a low pressure port PL. As illustrated in FIG. 1, the high pressure port PH and the low pressure port PL are connected to the second pressure chamber R4 and the first pressure chamber R3 of the vane pump 21, respectively.

Damping Effect

As illustrated in FIG. 1, for example, when the piston 1b moves downward, and the oil pressure of the first fluid chamber R1 increases, the working oil in the first fluid chamber R1 flows into the first pump chamber V1 from the first port P1 of the vane pump 21, discharges from the second pump chamber V2 via the second port P2 while rotating the fluid rotor 2b in a counterclockwise direction, and flows into the second fluid chamber R2. On the other hand, the working oil flowing out from the first fluid chamber R1 flows into the second pressure chamber R4 via the high pressure port PH of the first valve 4, and presses the outer ring member 2c1 to reduce the amount of offset with respect to the fluid rotor 2b. At this time, the volume of the first pressure chamber R3 is reduced, and the working oil in the first pressure chamber R3 flows into the low pressure port PL of the first valve 4, and returns further to the second fluid chamber R2.

Figure 3:
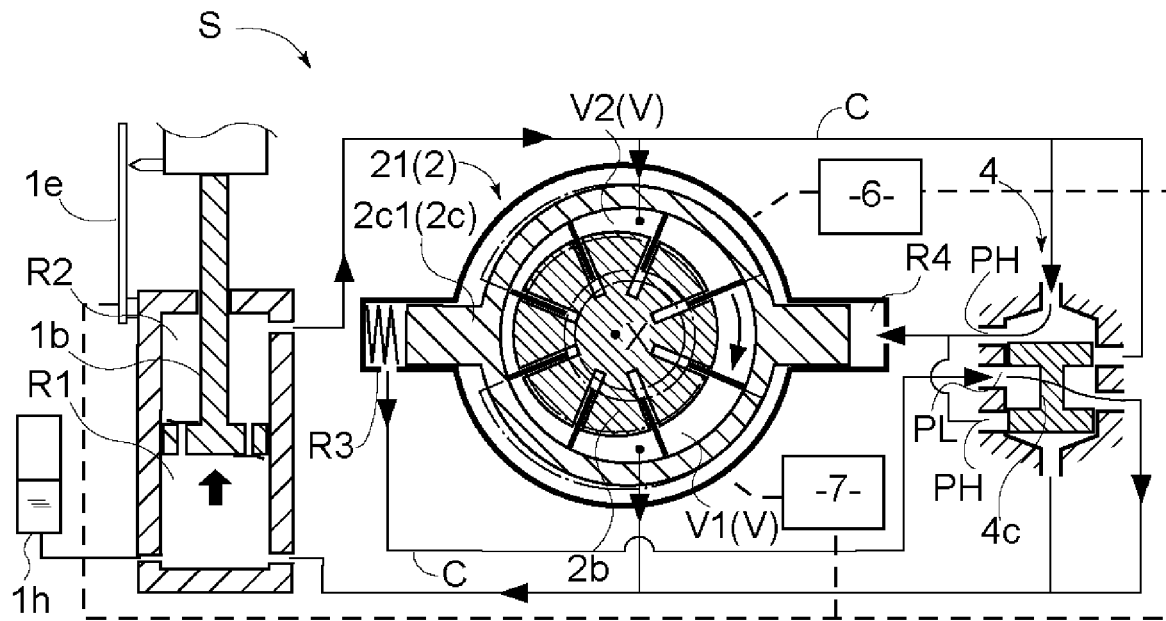
FIG. 3 is a description view illustrating the configuration and the regenerative operation of the shock absorber according to the first embodiment.

Conversely, as illustrated in FIG. 3, when the piston 1b moves upward and the oil pressure of the second fluid chamber R2 increases, the working oil in the second fluid chamber R2 flows into the second pump chamber V2 via the second port P2, discharges from the first pump chamber V1 via the first port P1 while rotating the fluid rotor 2b in a clockwise direction, and flows into the first fluid chamber R1. On the other hand, the working oil flowing out from the second fluid chamber R2 flows into the second pressure chamber R4 via the high pressure port PH of the first valve 4, and presses the outer ring member 2c1 to reduce the amount of offset with respect to the fluid rotor 2b. At this time, the volume of the first pressure chamber R3 is reduced, and the working oil in the first pressure chamber R3 flows into the low pressure port PL of the first valve 4, and returns further to the first fluid chamber R1.

As described above, in the shock absorber S of this embodiment, the larger the operation speed of the piston 1b is, the further the flow rate of the vane pump 21 is limited, and the damping effect of the piston 1b is enhanced. However, the rotational direction of the fluid rotor 2b is changed in response to the operation direction of the piston 1b.

Regenerative Operation

Figure 2:
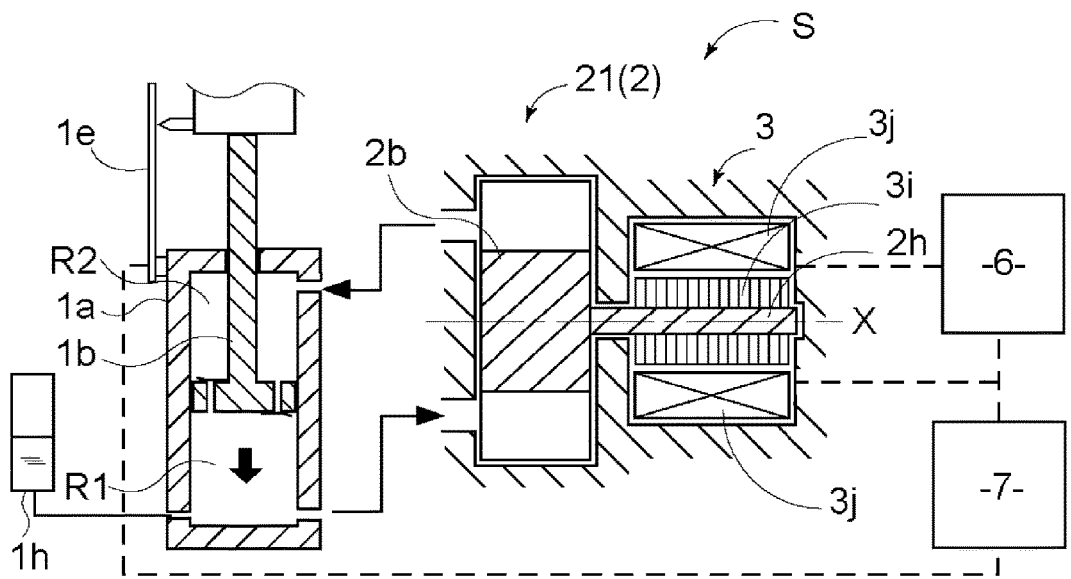
FIG. 2 is a description view illustrating the configuration of the shock absorber according to the first embodiment.

As Illustrated in FIG. 2, an electric rotor 3i is connected, as the rotary armature 3, to a rotary shaft 2h of the fluid rotor 2b. The mode of connection is random. For example, the fluid rotor 2b and the electric rotor 3i may be fixed to one shaft, or the fluid rotor 2b and the electric rotor 3i may rotate in conjunction with each other via gears or a belt. A stator 3j which forms a magnetic field between the electric rotor 3i and the stator 3j is provided around the electric rotor 3i. Accordingly, if the fluid rotor 2b rotates, the electric rotor 3i rotates to generate a regenerative current. The regenerative current is stored as electric energy in a battery 6.

The regenerative current varies depending on the rotational speed of the electric rotor 3i. In this embodiment, the more rapidly the piston 1b moves, the further the amount of offset of the outer ring member 2c1 is reduced, and the flow rate of the working oil is reduced. As a result, the number of rotations of the fluid rotor 2b increases, and the regenerative current becomes large.

Incidentally, between a regenerative operation in FIG. 1 and a regenerative operation in FIG. 3, the direction to press the outer ring member 2c1 is the same, but the rotational direction of the fluid rotor 2b is opposite to that of the electric rotor 3i.

Power Running Operation

Figure 4:
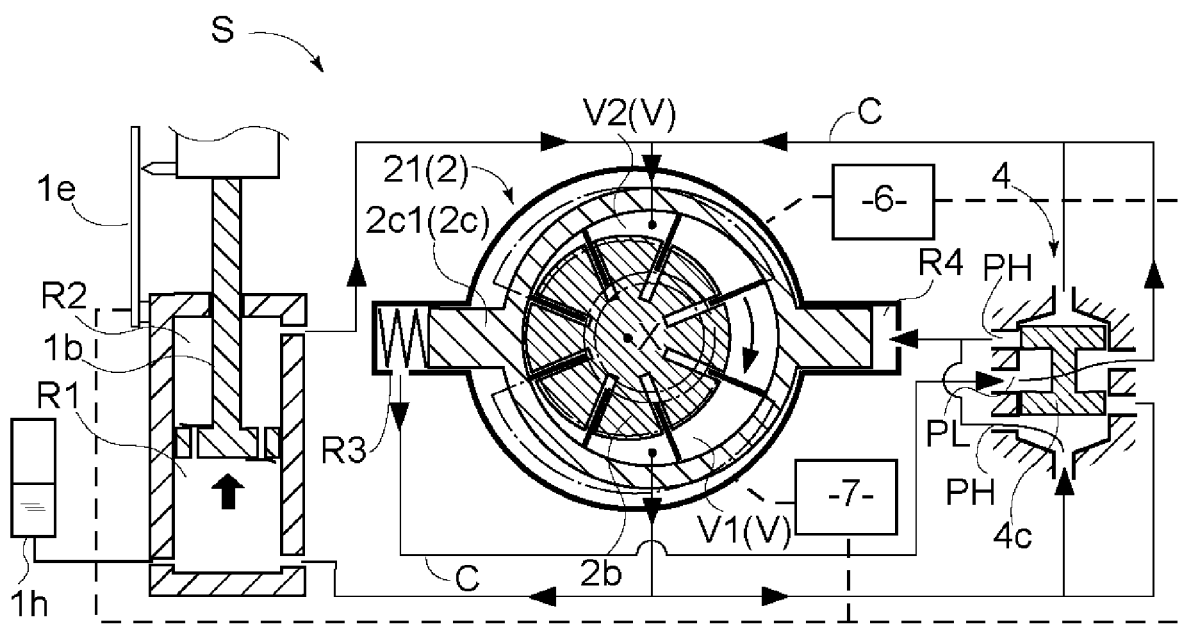
FIG. 4 is a description view illustrating a power running operation of the shock absorber according to the first embodiment.

As illustrated in FIG. 4, the electric rotor 3i and the stator 3j are also capable of serving as a drive motor. Namely, if the vane pump 21 is actively rotated, the working oil circulates to operate the piston 1b. For example, a drive current is applied to the electric rotor 3i, so that the electric rotor 3i and the fluid rotor 2b rotate in the clockwise direction. Accordingly, the working oil is suctioned into the second pump chamber V2 from the second fluid chamber R2, and flows into the first fluid chamber R1 via the first pump chamber V1. As a result, the piston 1b is pushed upward, and the vehicle height of the vehicle is raised. In the power running operation, for example, a stroke sensor 1e is provided between the piston 1b and the cylinder 1a, and while monitoring a change in the position of the piston 1b, a control portion 7 changes the rotational speed of the electric rotor 3i.

It is possible to change the response speed of the vehicle height regulation by regulating the rotational speed of the electric rotor 3i. For example, FIG. 4 illustrates the case where the rotational speed of the electric rotor 3i and the fluid rotor 2b is low. Since the amount of the working oil circulating through the vane pump 21 at this time is small, a difference between the pressure of the second pump chamber V2 and the pressure of the first pump chamber V1 is small. However, since the pressure of the first pump chamber V1 which is a discharge side is higher than the pressure of the second pump chamber V2 which is a suction side, part of the working oil discharged from the first pump chamber V1 flows into the first valve 4, and the working oil flows into the second pressure chamber R4 from the high pressure port PH.

Accordingly, the outer ring member 2c1 is pushed to reduce the amount of offset however, since the initial number of rotations of the fluid rotor 2b is low, the amount of offset of the outer ring member 2c1 is difficult to reduce. As a result, a large amount of offset of the fluid rotor 2b is maintained, and the flow rate of the working oil circulating through the vane pump 21 is set large. Namely, it is possible to demonstrate high response characteristics capable of quickly moving the piston 1b. Incidentally, in this case, it can be said that the rotational speed of the fluid rotor 2b is not so high and the thrust to operate the piston 1b is small.

Figure 5:
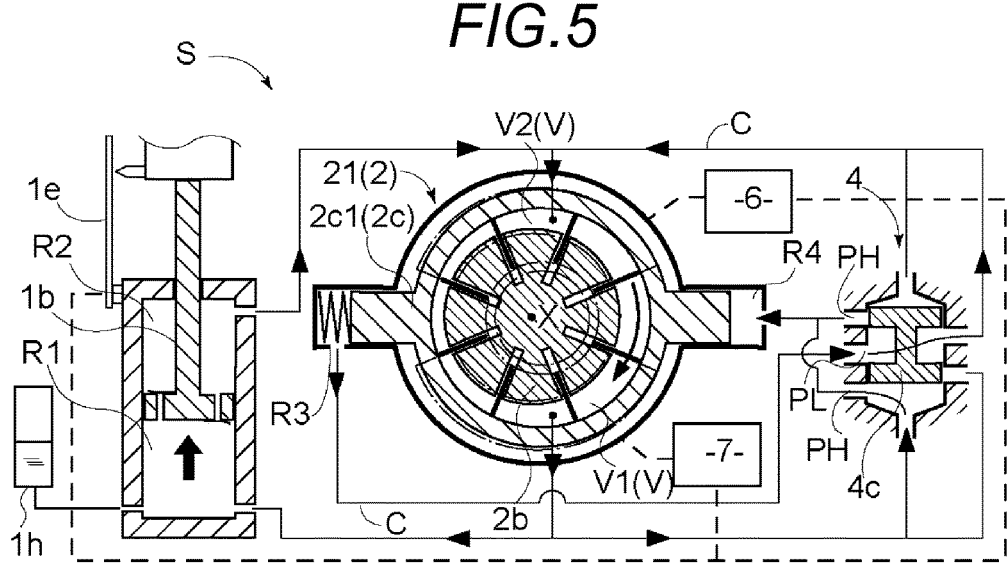
FIG. 5 is a description view illustrating the power running operation of the shock absorber according to the first embodiment.

On the other hand, if the rotational speed of the electric rotor 3i and the fluid rotor 2b is set high, as illustrated in FIG. 5, the amount of the working oil circulating through the vane pump 21 increases, and a difference between the pressure of the second pump chamber V2 and the pressure of the first pump chamber V1 becomes large. Therefore, part of the working oil discharged from the first pump chamber V1 flows with great force into the second pressure chamber R4 via the first valve 4, and the amount of offset of the outer ring member 2c1 is further reduced. As a result, the flow rate of the working oil circulating through the vane pump 21 is reduced, and the piston 1b moves moderately, in other words, low response characteristics are demonstrated. Incidentally, since the rotational speed of the fluid rotor 2b is high, the working oil reliably circulates into the vane pump 21, and the thrust to operate the piston 1b becomes large.

As in this embodiment, if the absorber main body 1 is connected to the vane pump 21 via the flow path C of the working oil, and the working oil held by the absorber main body 1 is used, as it is, to rotate the vane pump 21, only the flow path C of the working oil may be provided between the absorber main body 1 and the vane pump 21, and it is possible to make the configuration of the apparatus very compact.

In addition, since the vane pump 21 is driven by the fluid, there is no concern such as the occurrence of a back lash that is likely to occur in a transmission mechanism using a screw member and the like, and it is possible to demonstrate a smooth and highly responsive cushioning effect.

Furthermore, with this configuration, since the outer ring member 2c1 is moved by the pressure of the working oil in the first fluid chamber R1 and the second fluid chamber R2, it is not necessary to separately prepare an electric drive portion, and it is possible to simplify the structure of the apparatus.

The vane pump 21 described above may be small, and the entirety of the apparatus becomes compact, and the ease of mounting to various apparatuses improves. Moreover, since the configuration where the fluid rotor 2b and the electric rotor 3i rotate in conjunction with each other is very simple, it is possible to prevent an increase in the manufacturing cost of the apparatus with no increase in the size of the apparatus.

Second Embodiment

Figure 6:
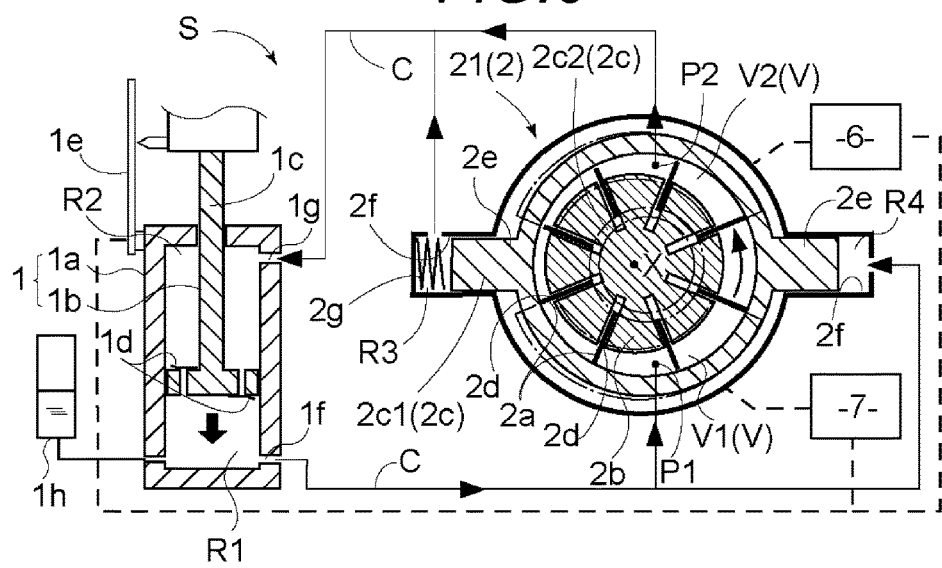
FIG. 6 is a description view illustrating a configuration and a regenerative operation of a shock absorber according to a second embodiment.

FIG. 6 is an example of when the first valve 4 is eliminated from the first embodiment described above. Here, the fluid from the first cylinder port 1f is connected to the first port P1 and the second pressure chamber R4, and the fluid from the second cylinder port 1g is connected to the second port P2 and the first pressure chamber R3.

FIG. 6 illustrates a state where the piston 1b is relatively lowered, for example, a state where a wheel of the vehicle is thrusted upward and the fluid in the first fluid chamber R1 is pushed out. In such state, it is necessary to prevent the wheel from being thrusted upward, and it is necessary to reduce the amount of the fluid circulating through the vane pump 21.

The fluid flowing out from the first fluid chamber R1 flows into the second pressure chamber R4, and presses the ring member 2c close to the rotation center X of the fluid rotor 2b. As a result, the amount of the fluid circulating from the first pump chamber V1 to the second pump chamber V2 is reduced, and the operation of the piston 1b is cushioned. In addition, since the fluid rotor 2b rotates with great force at this time, a good regenerative operation is performed.

On the other hand, if the piston 1b rises relatively upward, namely, if the wheel descends suddenly, preferably, the operation of the piston 1b is not cushioned since the wheel is capable of maintaining the state of installation with respect to the ground. In this case, the fluid flowing out from the second cylinder port 1g flows into the first pressure chamber R3 and presses the ring member 2c, and a large amount of offset with respect to the fluid rotor 2b is secured. As a result, the circulation amount of the fluid from the second pump chamber V2 to the first pump chamber V1 is largely maintained, and the cushioning effect of the piston 1b is reduced.

Incidentally, when the fluid is to be supplied to the first fluid chamber R1 so as to raise the vehicle height, the rotary armature 3 may be energized and driven. In the example of FIG. 6, the fluid rotor 2b rotates in the clockwise direction. In this case, a high pressure of the fluid flows into the second pressure chamber R4, and the amount of offset of the ring member 2c is reduced. Namely, the circulation amount of the fluid from the second pump chamber V2 to the first pump chamber V1 is reduced, and the responsiveness of the vehicle height regulation decreases; however, it is possible to perform a power running operation with a large lift torque.

Third Embodiment

Figure 7:
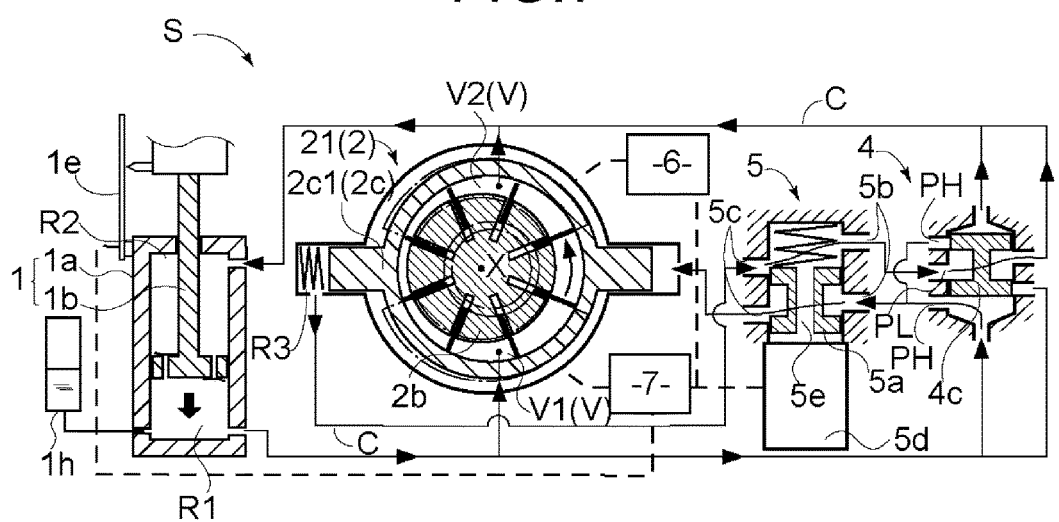
FIG. 7 is a description view illustrating a configuration and a regenerative operation of a shock absorber according to a third embodiment.

As illustrated in FIGS. 7 and 8, a second valve 5 can be provided between the vane pump 21 and the first valve 4 so that the second valve 5 can be electrically driven to change the circulation path and the circulation amount of the working oil. For example, an oil control valve (OCV) is used as the second valve 5.

A plunger 5a having a penetration flow path 5e at a center is provided inside the second valve 5. The control portion 7 outputs a drive signal to the second valve 5, for example, based on a signal acquired from the stroke sensor 1e provided between the piston 1b and the cylinder 1a of the absorber main body 1, such that the position of the plunger 58 is controlled.

In the second valve 5, the working oil from the high pressure port PH is connected to one of two acceptance ports 5b provided in the second valve 5, and the working oil from the low pressure port PL is connected to the other of the acceptance ports 5b. In addition, two discharge ports 5c are formed in the second valve 5. The states of communication between two acceptance ports 5b and two discharge ports 5c are switched by performing switching between the positions of the plunger 5a thereinside. The plunger 5a is positioned by operating a solenoid portion 5d based on a drive signal from the control portion 7.

Figures 8A, 8B, 8C:
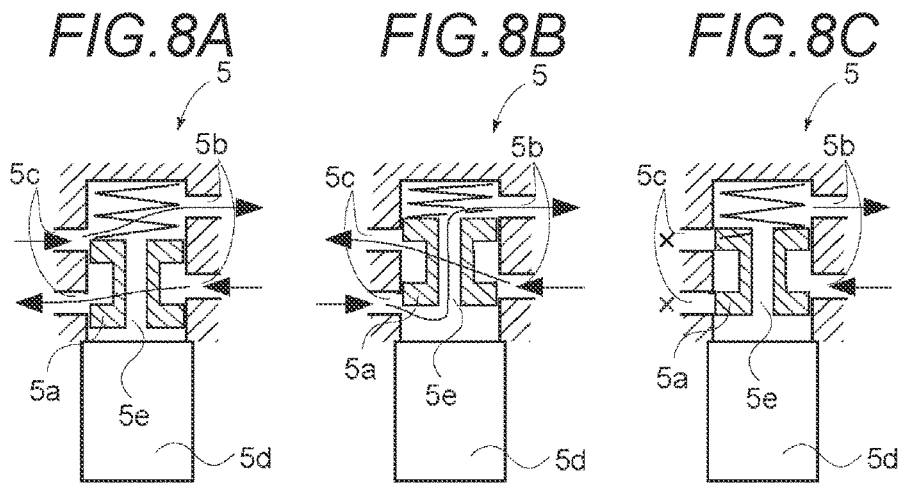
FIGS. 8A to 8C are description views illustrating an operation mode of a second valve according to the third embodiment and a seventh embodiment.

FIGS. 7 and 8A are an example of when a user wants to set the suspension at a stiff setting or the vehicle travels off road. In this case, in order to maintain a small amount of offset of the outer ring member 2c1, namely, to hold a large amount of the working oil in the second pressure chamber R4, the second valve 5 is driven to move the plunger 5a downward such that the working oil reaches the second pressure chamber R4 from the high pressure port PH of the first valve 4. Accordingly, the operation of the piston 1b is dampened, a change in vehicle height is prevented, and the occurrence of an event such as a lower portion of a vehicle body coming into contact with the ground is prevented.

On the other hand, FIG. 8B is an example of when the vehicle travels on a highway. If due to upward and downward movements of the vehicle, the position of the piston 1b is changed and there occurs a pressure difference between the first pump chamber V1 and the second pump chamber V2, the circulation amount of the working oil between the first pump chamber V1 and the second pump chamber V2 is largely secured. Namely, the plunger 5a is raised so that the high pressure port PH is connected to the first pressure chamber R3 and the low pressure port PL is connected to the second pressure chamber R4. Accordingly, a large amount of offset of the outer ring member 2c1 is maintained, and the circulation amount of the working oil from the first pump chamber V1 to the second pump chamber V2 is largely maintained. The movement of the piston 1b is not much dampened, and the wheels of the vehicle traveling at a high speed move upward and downward; however, it is possible to acquire a stable traveling state where the vehicle body does not move upward and downward.

As illustrated in FIG. 8C, if the circulation of the working oil between the first valve 4 and the first pressure chamber R3 and between the first valve 4 and the second pressure chamber R4 is shut off, the amount of offset of the outer ring member 2c1 is fixed. Accordingly, for example, the stiffness of the suspension can be set constant.

If the vehicle height regulation is performed by driving the electric rotor 3i, the state of the second valve 5 may be any one of the states of FIGS. 8A to 8C. If the electric rotor 3i is driven, the working oil flows, and further flows into the first fluid chamber R1 or the second fluid chamber R2, and the height of the piston 1b is changed. If the change in the position of the piston 1b is measured with the stroke sensor 1e at this time, even though the electric rotor 3i is reversely rotated, it is possible to quickly reverse the electric rotor 3i.

In addition, if a power running operation is performed to quickly raise the vehicle height, the second valve 5 is controlled to enter the state of FIG. 8B and a large amount of the working oil flows into the first pressure chamber R3, so that the amount of offset of the outer ring member 2c1 increases. Accordingly, a larger amount of the working oil circulates from the second pump chamber V2 to the first pump chamber V1 of the vane pump 21 to push the piston 1b upward, and thus it is possible to quickly raise the vehicle height.

Fourth Embodiment

Figure 9:
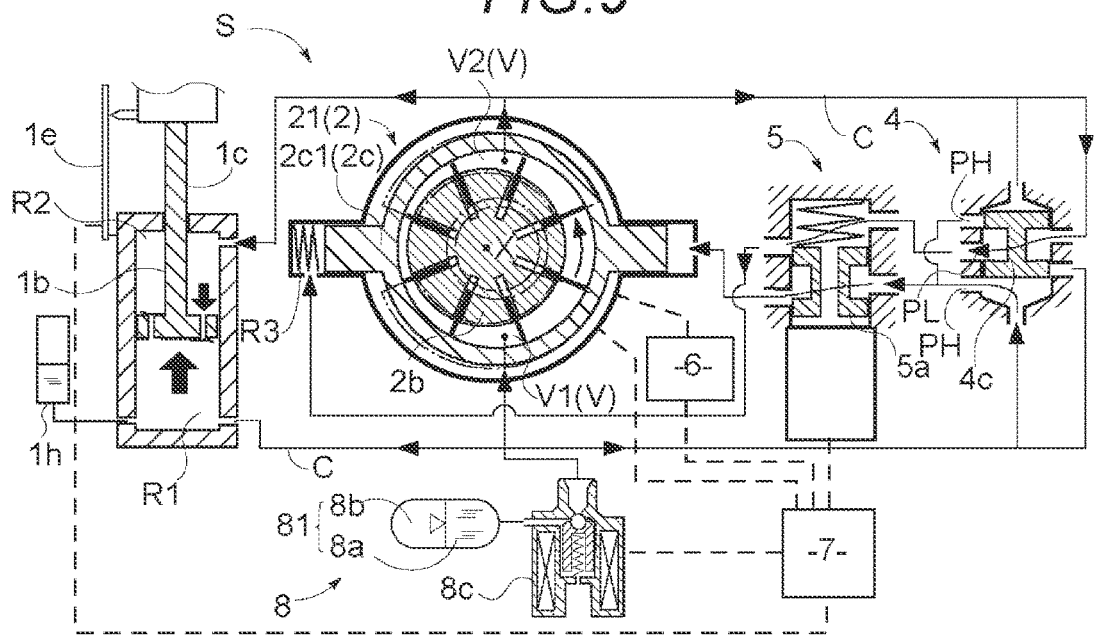
FIG. 9 is a description view illustrating an operation mode of a shock absorber according to a fourth embodiment.

FIG. 9 illustrates the shock absorber S according to a fourth embodiment disclosed here. Here, a pressure regulating portion 8 which regulates the pressure of the working oil is provided at any location on the flow path C of the working oil. For example, an accumulator 81 which holds the working oil is used as the pressure regulating portion 8. An oil chamber 8a which holds the working oil, and a gas chamber 8b which holds high pressure gas are provided inside the accumulator 81. Incidentally, the gas chamber 8b may include a spring as long as the gas chamber 8b is capable of applying a pressure to the working oil.

The oil chamber 8a is connected to, for example, the flow path C between the first fluid chamber R1 and the first valve 4 via a valve 8c. For example, an oil switching valve (OSV), which is energized to be able to control the opening and closing of the flow path C in an on-and-off manner by energization, is used as the valve 8c.

For example, if the vehicle height is wanted to be raised by raising the piston 1b of the absorber main body 1, the valve 8c is operated to be open, and the working oil in the oil chamber 8a is discharged to the flow path C. Accordingly, the entire pressure of the flow path C rises. On the other hand, if attentions are paid to the dimensions of the piston 1b, between both surfaces of the piston 1b, the area of one surface on which the rod 1c is provided is smaller by the cross-sectional area of the rod 1c than that of the other surface. Therefore, between both surfaces of the piston 1b, a large pressure is applied to the other surface on which the rod 1c is not provided, and the piston 1b rises. Accordingly, the vehicle height is raised.

Incidentally, if the vehicle height is raised by a predetermined height, for example, a coil spring (not illustrated) which is provided beside the absorber main body 1 extends, and a support load of the coil spring becomes small. Therefore, an upward load applied to the piston 1b, the amount of reduction in the support load of the coil spring, a vehicle weight, and the like are balanced out, and the vehicle height becomes constant at the predetermined height.

In FIG. 9, the fluid amount regulating portion 1h is provided outside the cylinder 1a, and in usual upward and downward movements of the piston 1b, the fluid amount regulating portion 1h maintains the fluid pressure of the entirety of the apparatus. However, in this embodiment including the accumulator 81, the fluid amount regulating portion 1h may be eliminated, and the accumulator 81 may serve also to maintain the fluid pressure in a usual situation.

Fifth Embodiment

Figure 10:
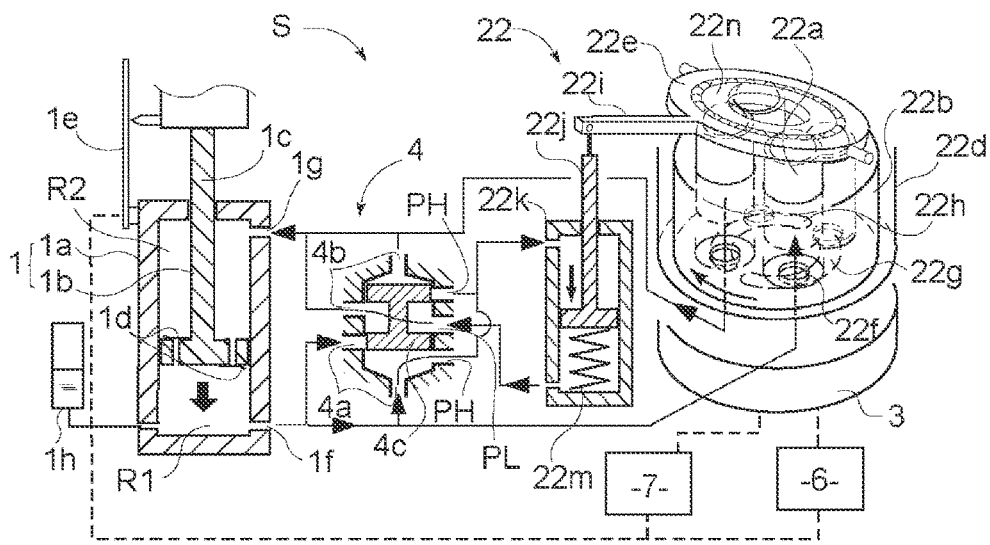
FIG. 10 is a description view illustrating a configuration of a shock absorber according to a fifth embodiment.

In the embodiments described above, the vane pump 21 is used as the pump 2; however, also any type of pump can be used as long as the pump is capable of changing a pump capacity. For example, as illustrated in FIG. 10, the angle of an inclined cam 22e may be changed in conjunction with the movement of the piston 1b by using an axial pump 22 that rotates a plurality of plungers 22a along the inclined cam 22e.

In the axial pump 22, four plungers 22a are held by a holder 22b, and a spring member (not illustrated) presses the plungers 22a against the inclined cam 22e that is provided inside a case 22d. A communication port 22f which leads to a fluid chamber formed by each of the plungers 22a is provided in a bottom portion of the holder 22b.

A first opening portion 22g and a second opening portion 22h, each of which has an arc shape and leads to two communication ports 22f, are provided in a bottom portion of the case 22d. The first opening portion 22g communicates with the first cylinder port 1f. The second opening portion 22h communicates with the second cylinder port 1g. Therefore, depending on from which port the fluid is discharged, the first opening portion 22g and the second opening portion 22h become a suction port or a discharge port of the axial pump 22.

Furthermore, the rotary armature 3 which rotates in conjunction with the holder 22b is provided in the bottom portion of the case 22d, and works such that the axial pump 22 serves as a fluid pressure motor for generating electric power or a fluid pressure pump for generating a fluid pressure.

The inclined cam 22e is swingably supported on the case 22d, and the incline angle thereof is changed by an arm 22i provided in a portion thereof. The arm 22i is connected to a cam piston 22j that reciprocates while partitioning the inside of a cam cylinder 22k into two spaces. A spring member 22m is provided in one of the spaces inside the cam cylinder 22k, and normally biases the cam piston 22j to increase the incline angle of the inclined cam 22e. In this embodiment the inclined cam 22e, the cam piston 22j, and the cam cylinder 22k serve as a flow rate change portion that changes the flow rate of the fluid circulating through the axial pump 22.

The first valve 4, which normally discharges a high pressure of the fluid from the high pressure port PH and enables a low pressure of the fluid to normally flow thereinto from the low pressure port PL, is provided between the cylinder 1a and the cam cylinder 22k. The first cylinder port 1f is connected to one pair of the ports 4a of the first valve 4. The second cylinder port 1g is connected to another pair of the ports 4b of the first valve 4. Between the spaces of the cam cylinder 22k, the high pressure port PH is connected to one space where the spring member 22m is not provided, and the low pressure port PL is connected to the other space where the spring member 22m is provided. In addition, the first cylinder port 1f is connected to the first opening portion 22g of the axial pump 22, and the second cylinder port 1g is connected to the second opening portion 22h.

FIG. 10 illustrates a state where the piston 1b is pushed downward and the fluid in the first fluid chamber R1 is pushed out. In the state of FIG. 10, since the fluid flows in from the first opening portion 22g to push the plungers 22a upward, the holder 22b rotates right in an arrow direction. A rotary cam 22n is provided inside the inclined cam 22e via a bearing, and is capable of rotating in the state of being in contact with apex portions of the plungers 22a. Accordingly, the retreat operation of the plunger 22a becomes smooth.

At an initial state, the inclined cam 22e has a maximum incline angle, and the amount of retreat of the plunger 22a along with the rotation of the holder 22b becomes the maximum. Namely, the amount of the fluid circulating through the axial pump 22 becomes the maximum, and the effect to cushion the operation of the piston 1b is small. For example, if the vehicle travels on a smooth road surface, the piston 1b moves relatively freely upward and downward, and very small upward and downward movements of the vehicle are reduced.

If the piston 1b is suddenly lowered, the cam piston 22j is pushed downward by the fluid flowing into the cam cylinder 22k from the high pressure port PH of the first valve 4, and the incline angle of the inclined cam 22e becomes small. As a result, the amount of retreat of the plunger 22a is reduced, the amount of the fluid circulating through the axial pump 22 is reduced, and the cushioning effect of the piston 1b is enhanced. At this time, the rotational speed of the holder 22b increases so as to circulate a predetermined amount of the fluid, the rotary armature 3 moves in conjunction therewith, the regeneration efficiency is enhanced.

Conversely, if the piston 1b rises suddenly, and a high pressure of the fluid is discharged from the second cylinder port 1g, the holder 22b rotates reversely. Also in this case, the larger the rising speed of the piston 1b is, the smaller the incline angle of the inclined cam 22e becomes, and thus the cushioning effect of the piston 1b is enhanced. For example, if the vehicle travels on a road surface having a relatively large roughness, the operation of the piston 1b is cushioned, and excessive upward and downward movements of the vehicle are reduced.

As described above, in the regenerative operation, even though the piston 1b operates in any direction, the more rapid the operation speed of the piston 1b is, the further the cushioning effect is enhanced, and thus it is possible to more generate regenerative current.

On the other hand, in the power running operation, if the rotary armature 3 is energized, since the holder 22b rotates in a random direction and the fluid is discharged from, for example, the first opening portion 22g, it is possible to raise the piston 1b.

Incidentally, the axial pump 22 can be applied also to the embodiment using the second valve 5 as illustrated in FIG. 7 and the embodiment using the pressure regulating portion 8 as illustrated in FIG. 9.

Sixth Embodiment

Figure 11:
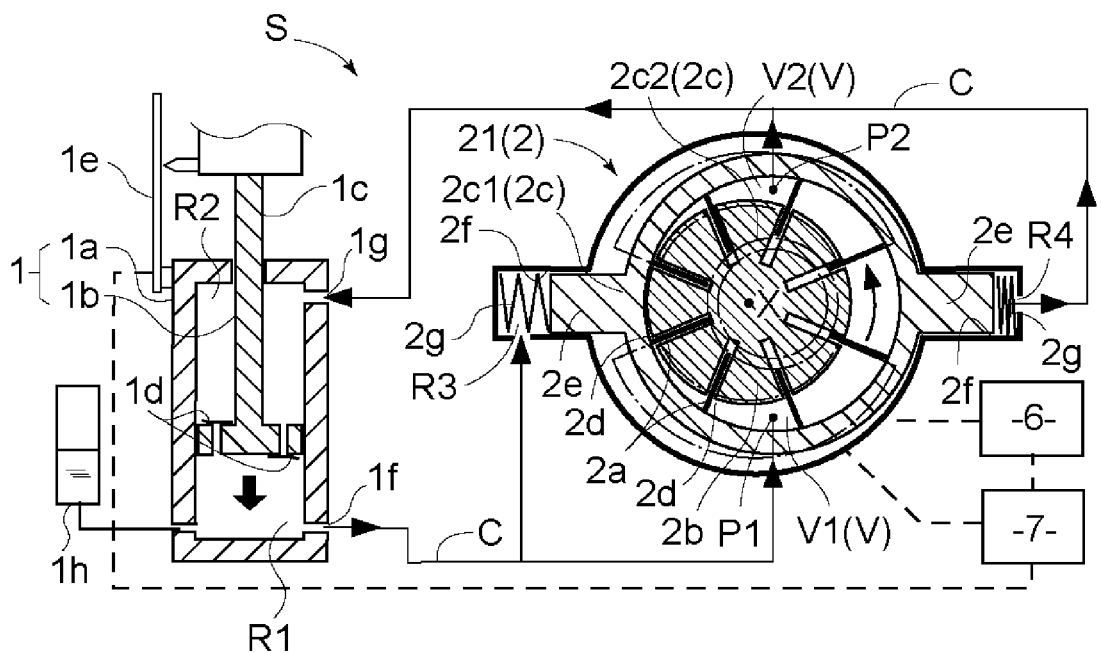
FIG. 11 is a description view illustrating a configuration and a regenerative operation of a shock absorber according to a sixth embodiment.

Unlike the first embodiment, in a sixth embodiment, the biasing portion 2g is provided also in the second pressure chamber. As illustrated in FIG. 11, the guide protrusions 2e and the guide grooves 2f form the first pressure chamber R3 and the second pressure chamber R4 to which the oil pressure of the working oil is applied. The first pressure chamber R3 and the second pressure chamber R4 are provided with the biasing portions 2g that apply pressing forces in a direction opposite to the outer ring member 2c1 to stabilize the outer ring member 2c1 at a position where the center of the outer ring member 2c1 is slightly offset with respect to the rotation center X of the fluid rotor 2b. In this embodiment, the center of the outer ring member 2c1 is slightly offset toward the right side with respect to the rotation center X in FIG. 11. Since the outer ring member 2c1 has the amount of offset as described above, if there occurs a pressure difference between the first pressure chamber R3 and the second pressure chamber R4, the rotational direction of the fluid rotor 2b is immediately determined. The biasing portions 2g are, for example, coil springs.

A plurality of pump chambers V which hold and transport the working oil are formed between the outer ring member 2c1 and the vanes 2a. In this embodiment, the first pump chamber V1 communicating with the first fluid chamber R1 and the second pump chamber V2 communicating with the second fluid chamber R2 are formed. The first fluid chamber R1 communicates with the first pump chamber V1 via the first port P1 provided in the vane pump 21. The second fluid chamber R2 communicates with the second pump chamber V2 via the second port P2 provided in the vane pump 21.

The larger the amount of offset of the outer ring member $2c1$ with respect to the fluid rotor $2b$ becomes, the larger a change in the volume of the pump chamber V along with the rotation of the fluid rotor $2b$ becomes, and thus the flow rate of the vane pump 21 increases. In this embodiment, normally, the amount of offset is present between the center of the outer ring member $2c1$ and the rotation center X of the fluid rotor $2b$ due to the biasing portions $2g$. An initial state of the vane pump 21 is a state where the flow rate is the minimum.

Namely, when the piston $1b$ moves quickly, it is difficult for the working oil to pass through the vane pump 21, and the damping effect of the operation of the piston is enhanced. In addition, the circulation amount of the working oil per rotation of the fluid rotor $2b$ is small; however since a predetermined amount of the working oil circulates due to the operation of the piston $1b$, the number of rotations of the fluid rotor $2b$ becomes large. Therefore, the rotational speed of the rotary armature 3 to be described later increases, and the regeneration effect is enhanced.

Rotary Armature

Figure 12:
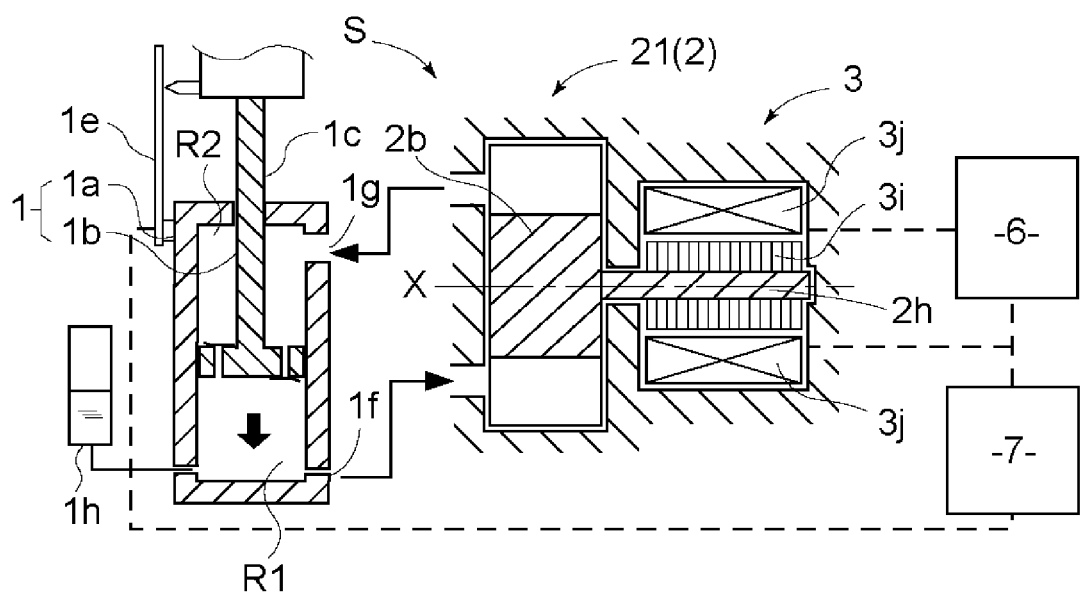
FIG. 12 is a description view illustrating the configuration of the shock absorber according to the sixth embodiment.

As illustrated in FIG. 12, the electric rotor $3i$ is connected, as the rotary armature 3, to the rotary shaft $2h$ of the fluid rotor $2b$. The mode of connection is random. For example, the fluid rotor $2b$ and the electric rotor $3i$ may be fixed to one shaft, or the fluid rotor $2b$ and the electric rotor $3i$ may rotate in conjunction with each other via gears or a belt. The stator $3j$ which forms a magnetic field between the electric rotor $3i$ and the stator $3j$ is provided around the electric rotor $3i$. Accordingly, if the fluid rotor $2b$ rotates, the electric rotor $3i$ rotates to generate a regenerative current. The regenerative current is stored as electric energy in the battery 6.

Regenerative Operation

The regenerative current varies depending on the rotational speed of the electric rotor $3i$. In this embodiment, since at an initial state, the amount of offset of the outer ring member $2c1$ is small and the amount of the working oil circulating through the vane pump 21 is reduced, the damping effect of the piston $1b$ is enhanced. If the piston $1b$ moves rapidly, the amount of offset of the outer ring member $2c1$ becomes large, and the working oil flows easily, and thus the damping effect of the piston $1b$ is reduced.

For example, in FIG. 11, when the piston $1b$ moves rapidly downward and a large amount of the working oil flows into the first pump chamber V1 from the first fluid chamber R1, a high pressure of the working oil flows also into the first pressure chamber R3. As a result, the outer ring member $2c1$ moves rightward as illustrated in FIG. 11, and the amount of offset increases. Accordingly, the amount of the working oil circulating from the first pump chamber V1 to the second pump chamber V2 increases, and the damping effect of the piston $1b$ is mitigated. In this case, since the number of rotations of the fluid rotor $2b$ and the electric rotor $3i$ is reduced, a generated regenerative current becomes small.

Figure 13:
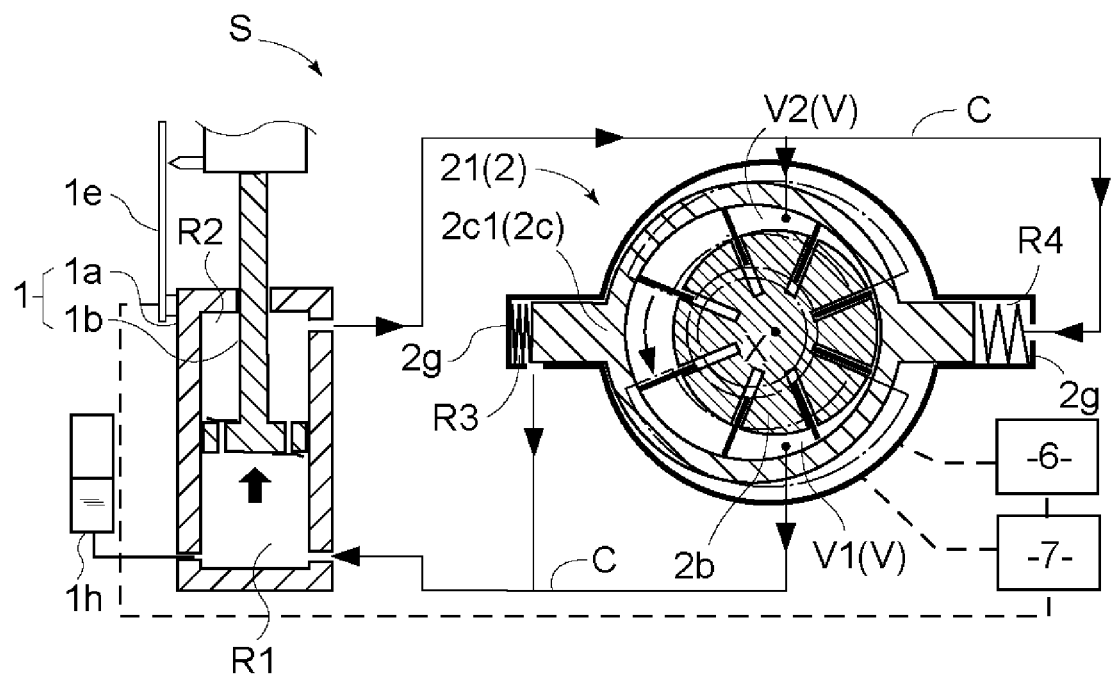
FIG. 13 is a description view illustrating the configuration and the regenerative operation of the shock absorber according to the sixth embodiment.

On the other hand, as illustrated in FIG. 13, if the piston $1b$ moves rapidly upward in the drawing, a high pressure of the working oil from the second fluid chamber R2 flows into the second pressure chamber R4. Therefore, the outer ring member $2c1$ moves leftward in FIG. 13. Also in this case, the amount of the working oil circulating through the vane pump 21 becomes large, and the damping effect of the piston $1b$ is reduced.

However, in the apparatus with this configuration, even though the piston $1b$ moves in any direction, the rotational direction of the fluid rotor $2b$ is the same as that of the electric rotor $3i$. Namely, since the position of the ring member $2c$ is changed by the working oil, the ring member $2c$ serves as a rotational direction setting portion that sets the rotational direction of the fluid rotor $2b$ to a constant rotational direction. Therefore, even though an extension and contraction state of the absorber main body 1 changes, only the rotational speed of the fluid rotor $2b$ and the electric rotor $3i$ changes, and the rotational direction is not reversed. Namely, compared to the case where the rotational direction of the fluid rotor $2b$ and the electric rotor $3i$ is reversed, a rotation energy is less dampened, and it is possible to maintain a higher regeneration efficiency.

Power Running Operation

Figure 14:
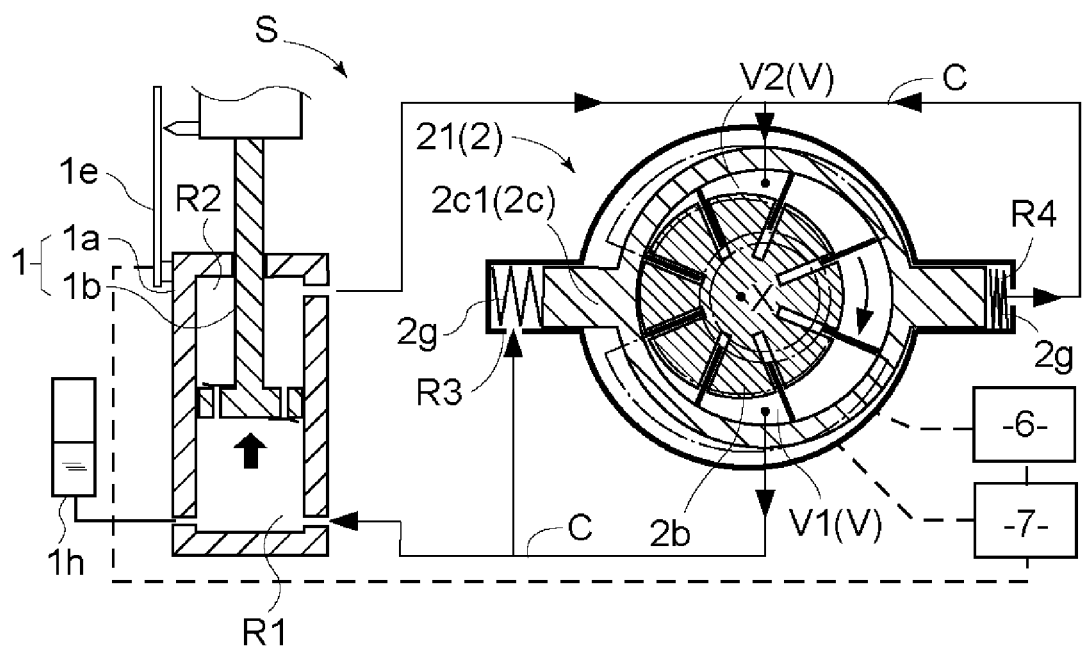
FIG. 14 is a description view illustrating a power running operation of the shock absorber according to the sixth embodiment.
Figure 15:
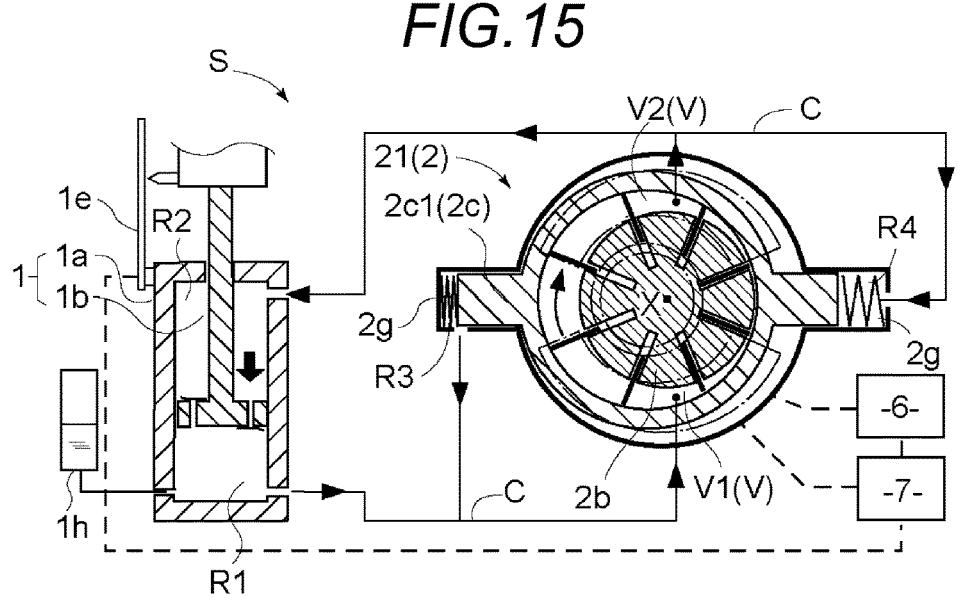
FIG. 15 is a description view illustrating the power running operation of the shock absorber according to the sixth embodiment.

As illustrated in FIGS. 14 and 15, in the shock absorber S of this embodiment, the electric rotor $3i$ and the stator $3j$ are also capable of serving as a drive motor. If the vane pump 21 is actively rotated, the working oil circulates to operate the piston $1b$. For example, a drive current is applied to the electric rotor $3i$, so that as illustrated in FIG. 14, the electric rotor $3i$ and the fluid rotor $2b$ rotate in the clockwise direction. The outer ring member 201 is offset toward the right in FIG. 14, and right sides of the first pump chamber V1 and the second pump chamber V2 with respect to the rotation center X have large volumes. Therefore, due to the rotation of the fluid rotor $2b$, the working oil is suctioned into the second pump chamber V2 and is discharged from the first pump chamber V1.

A high pressure of the working oil discharged from the first pump chamber V1 flows into the first pressure chamber R3, so that the outer ring member $2c1$ is made more offset toward the right side. As a result, the amount of the working oil circulating through the vane pump 21 increases, and the piston $1b$ is pushed upward by the working oil flowing into the first fluid chamber R1, and thus the vehicle height of the vehicle is raised. In the power running operation, for example, the stroke sensor $1e$ is provided between the piston $1b$ and the cylinder $1a$, and while monitoring a change in the position of the piston $1b$, the control portion 7 changes the rotational speed of the electric rotor $3i$.

It is possible to change the response speed of the vehicle height regulation by regulating the rotational speed of the electric rotor $3i$. For example, when the rotational speed of the electric rotor $3i$ and the fluid rotor $2b$ is low, since the amount of the working oil circulating through the vane pump 21 is small, a difference between the pressure of the second pump chamber V2 and the pressure of the first pump chamber V1 is small. However, since the pressure of the first pump chamber V1 which is a discharge side is higher than the pressure of the second pump chamber V2 which is a suction side, part of the working oil discharged from the first pump chamber V1 flows into the first pressure chamber R3.

Accordingly, the outer ring member $2c1$ is pushed to increase the amount of offset; however, since the number of rotations of the fluid rotor $2b$ is low, the amount of offset of the outer ring member $2c1$ is small. As a result, a small amount of offset of the fluid rotor $2b$ is maintained, and the flow rate of the working oil circulating through the vane pump 21 becomes small. Namely, low response characteristics are demonstrated, so that the piston b does not move that fast. Incidentally, in this case, the rotational speed of the fluid rotor $2b$ is not so high; however, the working oil is reliably supplied to the piston $1b$, and an operation thrust becomes large.

On the other hand, if the rotational speed of the electric rotor $3i$ and the fluid rotor $2b$ is set high, the amount of the working oil circulating through the vane pump 21 increases, and a difference between the pressure of the second pump chamber V2 and the pressure of the first pump chamber V1 becomes large. Therefore, part of the working oil discharged from the first pump chamber V1 flows with great force into the first pressure chamber R3, and the amount of offset of the outer ring member 2c1 increases further. As a result, the flow rate of the working oil circulating through the vane pump 21 increases, and it is possible to quickly move the piston 1b, in other words, high response characteristics are demonstrated. Incidentally, the rotational speed of the fluid rotor 2b increases; however, compared to the case where the rotational speed is low, since the circulation amount of the working oil per rotation of the fluid rotor 2b becomes larger, the thrust to operate the piston 1b becomes small.

FIG. 15 illustrates a state of the power running operation where the electric rotor 3i and the fluid rotor 2b move the piston 1b in a reverse direction while rotating in the same direction. For example, when the piston 1b is raised upward, the working oil in the second fluid chamber R2 is pushed out to flow into the second pressure chamber R4, and the outer ring member 2c1 moves leftward in FIG. 15. In order to actively stop the upward movement of the piston 1b in a state where the center of the outer ring member 2c1 is brought closer to the left side than the rotation center X of the fluid rotor 2b, the electric rotor 3i and the fluid rotor 2b rotate in the clockwise direction in FIG. 15. Accordingly, the working oil flows from the first pump chamber V1 toward the second pump chamber V2, and further flows into the second fluid chamber R2, and thus it is possible to prevent the rise of the piston 1b.

As described above, according to the shock absorber S with this configuration, for example, if the shock absorber S is used in the suspension of the vehicle, in addition to demonstrating the function of satisfactorily cushioning upward and downward movements of the wheel, if the fluid rotor 2b rotates, the electric rotor 3i rotates to generate a current, namely, regeneration is performed. In this case, when the piston 1b reciprocates, the circulation direction of the working oil circulating through the vane pump 21 is changed; however, since also the direction to press the outer ring member 2c1 is changed, the rotational direction of the fluid rotor 2b is maintained constant.

On the other hand, also when the electric rotor 3i is electrically driven to control the operation of the piston 1b, similarly, the direction to press the outer ring member 2c1 is appropriately reversed, and in a state where the rotational direction of the fluid rotor 2b is kept constant, the piston 1b is reciprocatable.

As described above, with this configuration, in the regenerative operation and the power running operation of the shock absorber S, the rotational direction of the fluid rotor 2b s constant regardless of the operation direction of the piston 1b. Therefore, an energy loss along with a variation in the rotation state of the fluid rotor 2b and the like is reduced, and it is possible to perform a regenerative operation and a power running operation with a good efficiency.

Seventh Embodiment

Figure 16:
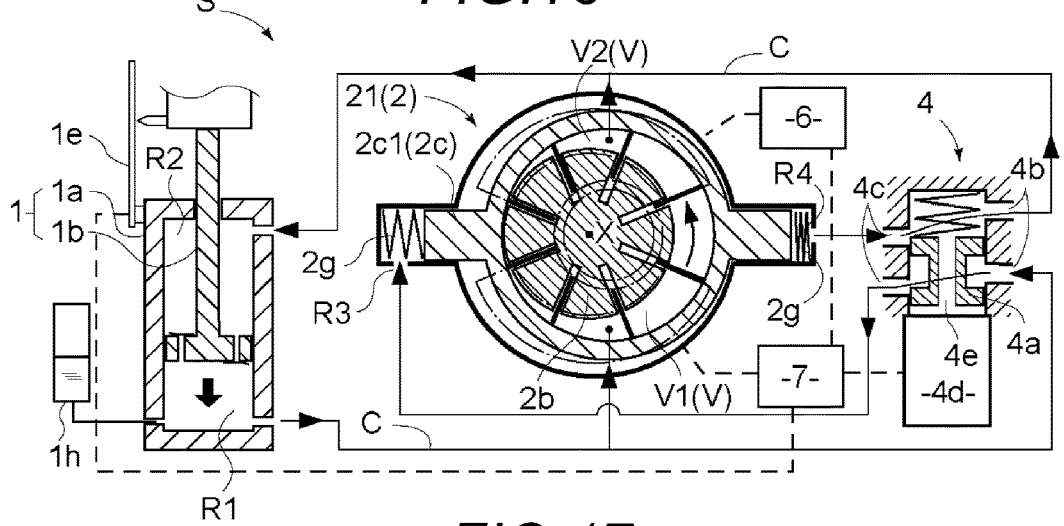
FIG. 16 is a description view illustrating a configuration and a regenerative operation of a shock absorber according to the seventh embodiment.

As illustrated in FIGS. 16 and 8, a valve 5 (third valve) can be provided beside the vane pump 21 so that the valve 5 can be electrically driven to change the circulation path and the circulation amount of the working oil. For example, an oil control valve (OCV) is used as the valve 5 (third valve).

The plunger 5a having the penetration flow path 5e at a center is provided inside the valve 5 (third valve). The control portion 7 outputs a drive signal to the valve 5 (third valve), for example, based on a signal acquired from the stroke sensor 1e provided between the piston 1b and the cylinder a of the absorber main body 1, such that the position of the plunger 5a is controlled.

In the valve 5 (third valve), the working oil from the first fluid chamber R1 is connected to one of two acceptance ports 5b provided in the valve 5 (third valve), and the working oil from the second fluid chamber R2 is connected to the other of the acceptance ports 5b. In addition, two discharge ports 5c are formed in the valve 5 (third valve). The states of communication between two acceptance ports 5b and two discharge ports 5c are switched by performing switching between the positions of the plunger 5a thereinside. The plunger 5a is positioned by operating the solenoid portion 5d based on a drive signal from the control portion 7.

FIGS. 16 and 8A are the cases where for example, when the vehicle travels on a highway, the prevention of upward and downward movements of the vehicle is wanted. When the pressure of the first fluid chamber R1 increases, the position of the plunger 5a is lowered and the working oil from the first fluid chamber R1 is supplied to the first pressure chamber R3, so that the amount of offset of the outer ring member 2c1 increases. Accordingly, the amount of the working oil circulating from the first pump chamber V1 to the second pump chamber V2 becomes large, and the effect to dampen the movement of the piston 1b is weakened. Namely, the wheels of the vehicle traveling at a high speed move upward and downward; however, it is possible to acquire a stable traveling state where the vehicle body does not move upward and downward. In this case, the rotational speed of the fluid rotor 2b is not that high, and the regeneration efficiency is inferior to that in the case of FIG. 8A.

FIG. 8B is an example of when the suspension is set stiff or the vehicle travels off road or the like. The valve 5 (third valve) is driven to cause the working oil to flow into the second pressure chamber R4 so as to reduce the amount of offset of the outer ring member 2c1 which is offset from the first. Accordingly, the circulation amount of the working oil between the first pump chamber V1 and the second pump chamber V2 is reduced, the operation of the piston 1b is dampened, a change in vehicle height is prevented, and it becomes difficult for an event such as the lower portion of the vehicle body coming into contact with the ground to occur. In this case, the rotational speed of the fluid rotor 2b increases, and the regeneration efficiency is improved.

FIG. 8C illustrates a state where the circulation of the working oil into the first pressure chamber R3 and the second pressure chamber R4 is shut off. Accordingly, the amount of offset of the outer ring member 2c1 is fixed. For example, a stiff setting of the suspension can be held constant.

Figure 17:
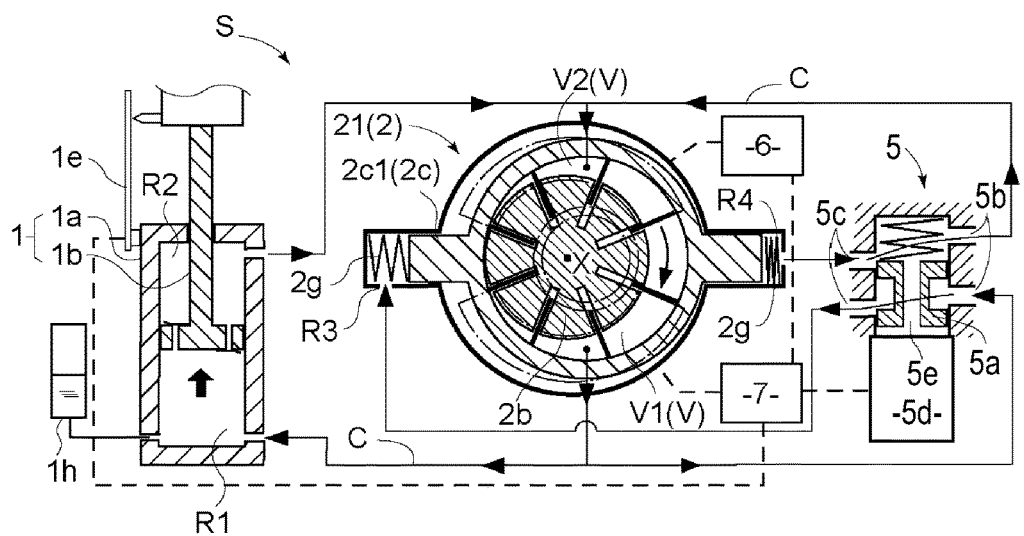
FIG. 17 is a description view illustrating the configuration and a power running operation of the shock absorber according to the seventh embodiment.

FIG. 17 illustrates an example of when the electric rotor 3i is driven to perform the vehicle height regulation. At this time, the state of the valve 5 may be, for example, any one of the states of FIGS. 8A to 8C. If the electric rotor 3i is driven, the working oil flows, and further flows into the first fluid chamber R1 or the second fluid chamber R2, and the height of the piston 1b is changed. If the change in the position of the piston 1b is measured with the stroke sensor 1e at this time, even though the electric rotor 3i is reversely rotated, it is possible to quickly reverse the electric rotor 3i.

In addition, if the piston 1b is wanted to be quickly raised, the valve 5 (third valve) is controlled to enter the state of FIG. 8A and a large amount of the working oil flows into the first pressure chamber R3, so that the amount of offset of the outer ring member 2c1 increases. Accordingly, a larger amount of the working oil circulates from the second pump chamber V2 to the first pump chamber V1 of the vane pump 21 to push the piston 1b upward, and thus it is possible to quickly raise the vehicle height.

Incidentally, when the regenerative operation is performed using the working oil in the first fluid chamber R1 as illustrated in FIG. 16, and when the power running operation is performed to supply the working oil from the first pump chamber V1 to the first fluid chamber R1 as illustrated in FIG. 17, the offset direction of the outer ring member 2c1 is the same; however, the rotational directions of the fluid rotor 2b and the electric rotor 3i are opposite to each other between the operations.

Eighth Embodiment

Figure 18:
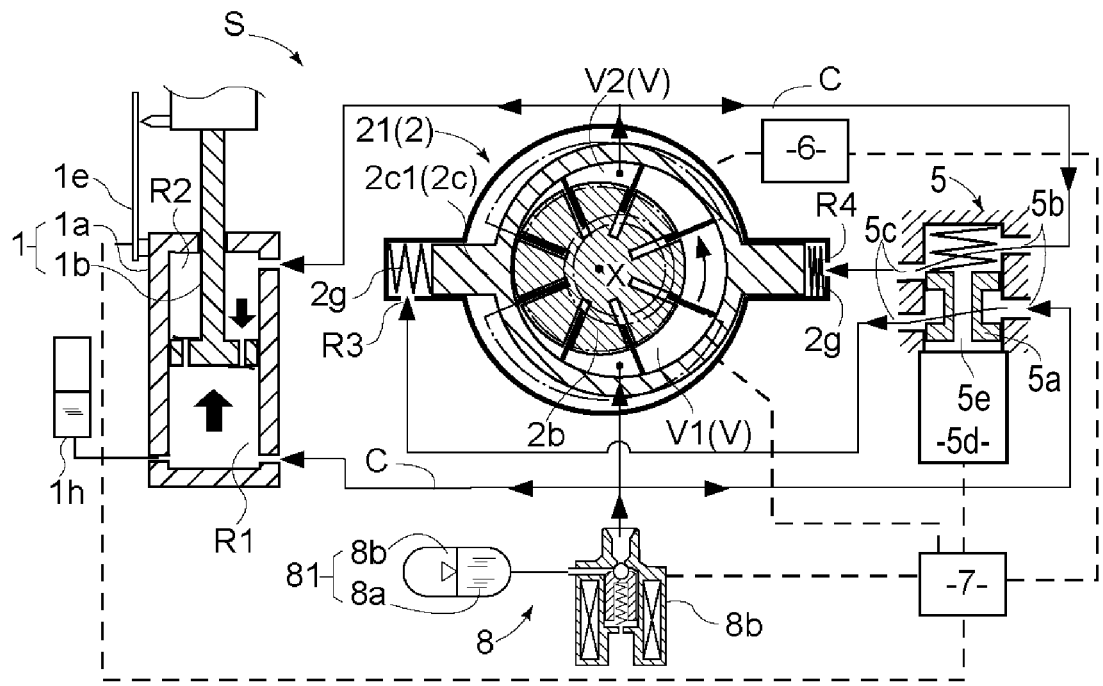
FIG. 18 is a description view illustrating an operation mode of a shock absorber according to an eighth embodiment.

FIG. 18 illustrates the shock absorber S according to an eighth embodiment disclosed here. Here, a pressure regulating portion 8 which regulates the pressure of the working oil is provided at any location on the flow path C of the working oil. For example, an accumulator 81 which holds the working oil is used as the pressure regulating portion 8. An oil chamber 8a which holds the working oil, and a gas chamber 8b which holds high pressure gas are provided inside the accumulator 81. Incidentally, the gas chamber 8b may include a spring as long as the gas chamber 8b is capable of applying a pressure to the working oil.

The oil chamber 8a is connected to, for example, the flow path C between the first fluid chamber R1 and the valve 5 (third valve) via a second valve 8c. For example, an oil switching valve (OSV), which is energized to be able to control the opening and closing of the flow path C in an on-and-off manner, is used as the second valve 8c.

For example, if the vehicle height is wanted to be raised by raising the piston 1b, the second valve 8c is operated to be open, and the working oil in the oil chamber 8a is discharged to the flow path C. Accordingly, the entire pressure of the flow path C rises. On the other hand, if attentions are paid to the dimensions of the piston 1b of the absorber main body 1, between both surfaces of the piston 1b, the area of one surface on which the rod 1c is provided is smaller by the cross-sectional area of the rod 1c than that of the other surface. Therefore, between both surfaces of the piston 1b, a large pressure is applied to the other surface on which the rod 1c is not provided, and the piston 1b rises. Accordingly, the vehicle height is raised.

Incidentally, if the vehicle height is raised by a predetermined height, for example, a coil spring (not illustrated) which is provided beside the absorber main body 1 extends, and a support load of the coil spring becomes small. Therefore, an upward load applied to the piston 1b, the amount of reduction in the support load of the coil spring, the vehicle weight, and the like are balanced out, and the vehicle height becomes constant at a predetermined height.

In FIG. 18, the fluid amount regulating portion 1h s provided outside the cylinder 1a, and in usual upward and downward movements of the piston 1b, the fluid amount regulating portion 1h maintains the fluid pressure of the entirety of the apparatus. However, in this embodiment including the accumulator 81, the fluid amount regulating portion 1h may be eliminated, and the accumulator 81 may serve also to maintain the fluid pressure in a usual situation.

Ninth Embodiment

Figure 19:
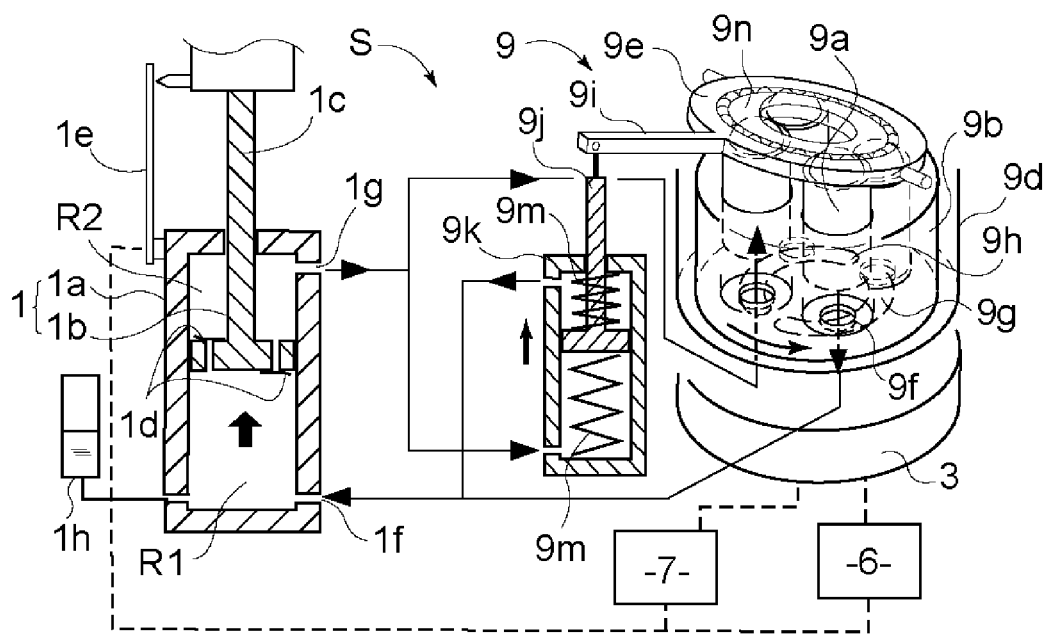
FIG. 19 is a description view illustrating a configuration of a shock absorber according to a ninth embodiment.

In the embodiments described above, the vane pump 21 is used as the pump 2; however, also any type of pump can be used as long as the pump is capable of changing a pump capacity. For example, as illustrated in FIG. 19, the angle of an inclined cam 9e may be changed in conjunction with the movement of the piston 1b by using an axial pump 9 that rotates a plurality of plungers 9a along the inclined cam 9e.

In the axial pump 9, four plungers 9a are held by a holder 9b, and a spring member (not illustrated) presses the plungers 9a against the inclined cam 9e that is provided inside a case 9d. A communication port 9f which leads to a fluid chamber formed by each of the plungers 9a is provided in a bottom portion of the holder 9b.

A first opening portion 9g and a second opening portion 9h, each of which has an arc shape and leads to two communication ports 9f, are provided in a bottom portion of the case 9d. The first opening portion 9g communicates with the first cylinder port 1f. The second opening portion 9h communicates with the second cylinder port 19g. Therefore, depending on from which port the fluid is discharged, the first opening portion 9g and the second opening portion 9h become a suction port or a discharge port of the axial pump 9.

The rotary armature 3 which rotates in conjunction with the holder 9b is provided in the bottom portion of the case 9d, and works such that the axial pump 9 serves as a fluid pressure motor for generating electric power or a fluid pressure pump for generating a fluid pressure.

The inclined cam 9e is swingably supported on the case 9d, and the incline angle thereof is changed by an arm 9i provided in a portion thereof. The arm 9i is connected to a cam piston 9j that reciprocates while partitioning the inside of a cam cylinder 9k into two spaces. Spring members 9m are provided in both of the spaces inside the cam cylinder 9k. The spring members 9m normally bias the cam piston 9j such that the incline angle of the inclined cam 9e is substantially neutral, namely, such that when each of the plungers 9a rotates, a change in the height of the plunger 9a is reduced. In this embodiment, the inclined cam 9e, the cam piston 9j, and the cam cylinder 9k serve as a flow rate change portion that changes the flow rate of the fluid circulating through the axial pump 9.

The first cylinder port 1f is connected to the first opening portion 9g of the axial pump 9 and one port of the cam cylinder 9k. The second cylinder port 1g is connected to the second opening portion 9h of the axial pump 9 and the other port of the cam cylinder 9k.

FIG. 19 illustrates a state where the piston 1b is pushed upward and the fluid in the second fluid chamber R2 is pushed out. In the state of FIG. 19, since the fluid flows in from the second opening portion 9h to push the plungers 9a upward, the holder 9b rotates left in an arrow direction. A rotary cam 9n is provided inside the inclined cam 9e via a bearing, and is capable of rotating in the state of being in contact with apex portions of the plungers 9a. Accordingly, the retreat operation of the plunger 9a becomes smooth.

At an initial state, the inclined cam 9e s set to be slightly inclined in any direction from a neutral position where when the plungers 9a rotate, the heights thereof are not changed. The initial incline direction is random; however, if the initial incline direction is aligned with a direction where the piston 1b operates easily, the holder 9b starts rotating smoothly. For example, as illustrated in FIG. 19, if there are many chances where the piston 1b are raised upward from a stationary state, the fluid discharged from the second fluid chamber R2 flows into the second opening portion 9h to rotate the holder 9b left. At this time, the arm 9i of the inclined cam 9e is pushed toward an upper side in FIG. 19 by the cam piston 9j, the inclined cam 9e is largely inclined, and the rotational speed of the holder 9b increases. Namely, since the inclined cam 9e is inclined in any direction from the initial state, if the pressure of the fluid is applied, the ease of rotation of the holder 9b improves.

With this configuration, when the piston 1b starts operating, since the inclined cam 9e is close to the neutral position, the amount of retreat of the plunger 9a along with the rotation of the holder 9b is reduced. Namely, the amount of the fluid circulating through the axial pump 9 becomes the minimum, and the effect to cushion the operation of the piston 1b is large.

As illustrated in FIG. 19, if the piston 1b is suddenly raised, the cam piston 9j is pushed upward by the fluid flowing into the lower port of the cam cylinder 9k from the second cylinder port 1g, and the incline angle of the inclined cam 9e becomes large. As a result, the holder 9b rotates in the arrow direction of FIG. 19. Accordingly, the amount of retreat of the plunger 9a becomes large, the amount of the fluid circulating through the axial pump 9 becomes large, and the cushioning effect of the piston 1b is weakened. At this time, the rotational speed of the holder 9b is lowered so as to circulate a predetermined amount of the fluid, the rotary armature 3 moves in conjunction therewith, also the regeneration efficiency decreases.

Conversely, if the piston 1b descends suddenly, and a high pressure of the fluid is discharged from the first cylinder port 1f, the fluid flows into the first opening portion 9g. At this time, the fluid flows into the upper port of the cam cylinder 9k, and the inclined cam 9e is inclined in an opposite direction. Accordingly, the same rotational direction of the holder 9b is maintained. Also in this case, the larger the descending speed of the piston 1b is, the larger the incline angle of the inclined cam 9e becomes, and thus the cushioning effect of the piston 1b is reduced.

As described above, in the regenerative operation, even though the piston 1b operates in any direction, the inclined cam 9e, the cam piston 9j, and the cam cylinder 9k serve as a rotational direction setting portion, and the rotational direction of the holder 9b is set to the same direction. With regard to the regeneration effect, if the amount of operation of the piston 1b is small, the cushioning effect and the regeneration effect are improved. On the other hand, if the amount of operation of the piston 1b is large, the cushioning effect and the regeneration effect are reduced. However, since the rotational direction of the holder 9b is the same, an energy to rotate the holder 9b against a rotational inertia of the holder 9b is not consumed, and a high regeneration efficiency is maintained.

On the other hand, in the power running operation, if the rotary armature 3 is energized, since the holder 9b rotates in a random direction and the fluid discharged from, for example, the first opening portion 9g is supplied to the first fluid chamber R1, it is possible to raise the piston 1b.

Incidentally, the axial pump 9 can be applied also to the embodiment using the valve 5 (third valve) as illustrated in FIG. 16 and the embodiment using the pressure regulating portion 8 as illustrated in FIG. 18.

Tenth Embodiment

Figure 20:
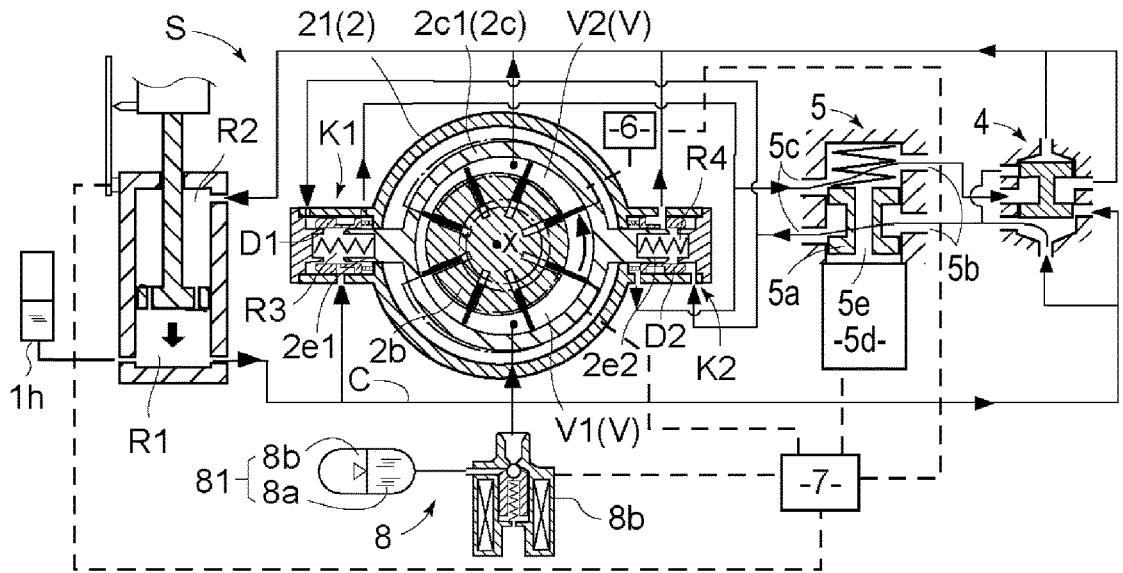
FIG. 20 is a description view illustrating a configuration of a shock absorber according to a tenth embodiment.

FIGS. 20 and 21 illustrate the shock absorber S according to a tenth embodiment.

In this embodiment, a first stopper portion K1 and a second stopper portion K2 are provided in the first pressure chamber R3 and the second pressure chamber R4 of the vane pump 21, respectively, to restrict the amount of offset of the outer ring member 2c1 in a predetermined range.

Between two guide protrusions 2e of the outer ring member 2c1, one which reciprocates inside the first pressure chamber R3 is a first guide protrusion 2e1, and the other which reciprocates inside the second pressure chamber R4 is a second guide protrusion 2e2.

The first stopper portion K1 has, for example, the following configuration. The first guide protrusion 2e1 is formed into, for example, a columnar shape. A first sleeve D1 is arranged to be inserted onto the first guide protrusion 2e1 and to move relative thereto. Simultaneously, the first sleeve D1 slides along an inner surface of the guide groove 2f of the pump 2. A first stopper spring E1 having, for example, a coil shape is in contact with one side of the first sleeve D1, and normally biases the first sleeve D1 outward of the pump 2.

The first sleeve D1 is slidable by the fluid. As illustrated in FIG. 21, a stopper port PK and a relief port PR are formed on both sides of a slide region of the first sleeve D1 so as to penetrate a wall portion of the guide groove 2f and to communicate with the slide region. Between the fluids discharged from the first fluid chamber R1 or the second fluid chamber R2 via the valve 5 (third valve) and a valve 4 (switching valve), the fluid on a high pressure side flows into the stopper port PK between the ports. Incidentally, due to a variation in the pressure of the fluid, the inflow and discharge of the fluid via the stopper port PK is repeated.

Since the first sleeve D1 moves along with the inflow and discharge of the fluid at the stopper port PK, along with the movement, the discharge and inflow of the fluid via the relief port PR on one side is performed. The first stopper spring E1 is provided inward of the relief port PR. When there is no difference between the fluid pressure of the first fluid chamber R1 and the fluid pressure of the second fluid chamber R2, the first stopper spring E1 moves the first sleeve D1 outward of the groove portion 2d. At this state, as will be described later, it is possible to secure the maximum movement amount of the outer ring member 2c1. This state is, for example, the case where a road surface on which the vehicle travels is not so much rough and the cushioning effect of the shock absorber S is not set so high.

In addition, the first stopper spring E1 biases the first sleeve D1 with a predetermined biasing force. The position of the first sleeve D1 is determined in response to a pressure difference between the fluids in the stopper port PK and the relief port PR. Namely, the higher the fluid pressure is, the further the first sleeve D1 is biased toward a center side of the pump 2, and restriction is performed such that the amount of offset of the outer ring member 2c1 is reduced.

A sleeve recess portion Da having an annular shape is formed over the entire periphery of an outer surface of the first sleeve D1. At least one sleeve communication bore Db is formed in the sleeve recess portion Da at a specific location. The sleeve communication bore Db is, for example, a portion through which a high pressure of the fluid in the first fluid chamber R1 flows into the first pressure chamber R3.

Figure 21A:
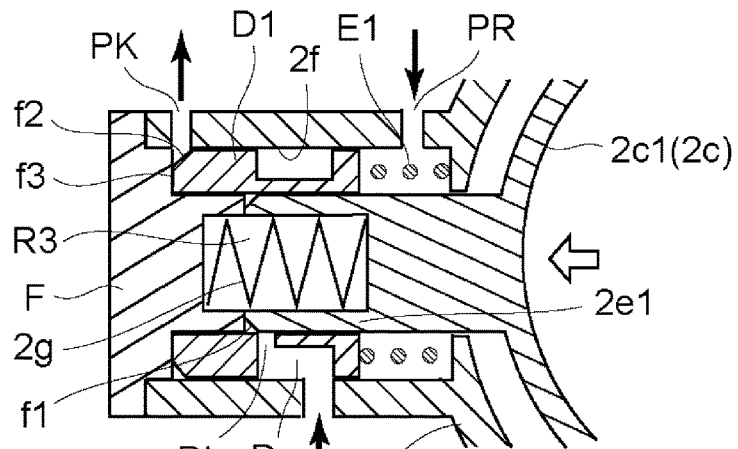

For example, as illustrated in FIG. 21A, when the amount of offset of the outer ring member 2c1 is the maximum to reduce the volume of the first pressure chamber R3, an end surface of the first guide protrusion 2e1 comes into contact with a lid member F attached to an end portion of the groove portion 2d. The biasing portion 2g which is built in the first pressure chamber R3 is in the most contracted state. As described above, if the offset of the outer ring member 2c1 is allowed, the shock absorber S does not much demonstrate a damping effect.

Namely, for example, the fluid flowing into the first pump chamber V1 of the pump 2 circulates to the second pump chamber V2 at a large flow rate. Therefore, the number of rotations of the fluid rotor 2b is reduced; however, the damping effect attained by the pump 2 is reduced. Incidentally, a first inclined surface f1 is formed in a portion of the end surface of the first guide protrusion 2e1. The first inclined surface f1 quickly separates the first guide protrusion 2e1, which is in contact with the lid member F, from the lid member F.

In order to enhance the damping effect, for example, the amount of the fluid flowing into the stopper port PK is to be increased by regulating the position of the plunger 5a of the valve 5 (third valve). As a result, a fluid pressure is applied to a second inclined surface f2, which is formed in an end portion of the first sleeve D1, and a planar surface f3 in the vicinity of the second inclined surface f2, so that the first sleeve D moves to, for example, a position illustrated in FIG. 21B. Since the movement amount of the first sleeve D1 is determined by a pressure difference between the fluids in the stopper port PK and the relief port PR, if a pressure difference between both is monitored with a pressure measurement portion or the like which is not illustrated, it is possible to recognize the position of the first sleeve D1.

In order to enhance the damping effect of the shock absorber S, as described above, the position of the first sleeve D1 is to be shifted toward the center side of the pump 2. If the discharge port 5c of the valve 4 is blocked by operating the plunger 5a of the valve 5 (third valve) at this state, the position of the first sleeve D1 is fixed. Incidentally, since also the operation of a second sleeve D2 on the other side is determined by a pressure difference between the fluids in the stopper port PK and the relief port PR, the position of the first sleeve D1 is symmetrical with the position of the second sleeve D2 with respect to an rotation axis X of the vane pump 21.

Figure 21B:
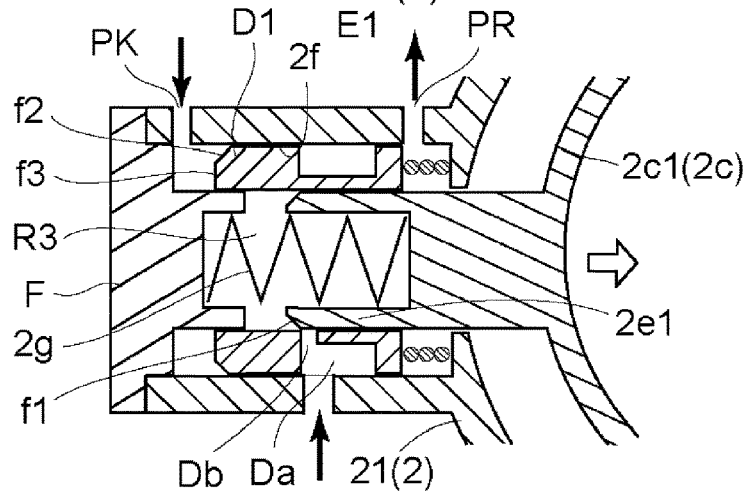

For example, if at this state, the pressure of the second fluid chamber R2 increases and the outer ring member 2c1 becomes offset to reduce the volume of the first pressure chamber R3, when in the state of FIG. 21B, the fluid present inside the first pressure chamber R3 is confined. Namely, the first pressure chamber R3 is shut off from the outside at the moment an outer surface of the first guide protrusion 2e1 blocks the sleeve communication bore Db of the first sleeve D1, and the fluid in the first pressure chamber R3 is sealed. As a result, the outer ring member 2c1 is prevented from becoming further offset.

As described above, if the positions of the first sleeve D1 and the second sleeve D2 are set by operating the valve 5 (third valve), an allowable amount of offset of the outer ring member 2c1 is changed. Accordingly, it is possible to appropriately set the damping effect of the shock absorber S or a generated electric power resulting from regeneration.

Incidentally, also when power running is performed on the shock absorber S, the restriction to the position of the outer ring member 2c1 is effective. For example, when the fluid rotor 2b is driven, if the amount of offset of the outer ring member 2c1 is reduced, the flow rate of the pump 2 is reduced. In this case, it is possible to generate a high load (high oil pressure), and it is possible to finely regulate the vehicle height. On the other hand, if the amount of offset of the outer ring member 2c1 increases, since the flow rate of the pump 2 increases with the rotation of the fluid rotor 2b, for example, it is possible to quickly change the vehicle height.

Incidentally, since the second stopper portion K2 on the other side has the same configuration and operates in the same manner as that of the first stopper portion K1, detailed description will be omitted.

Eleventh Embodiment

Figure 22:
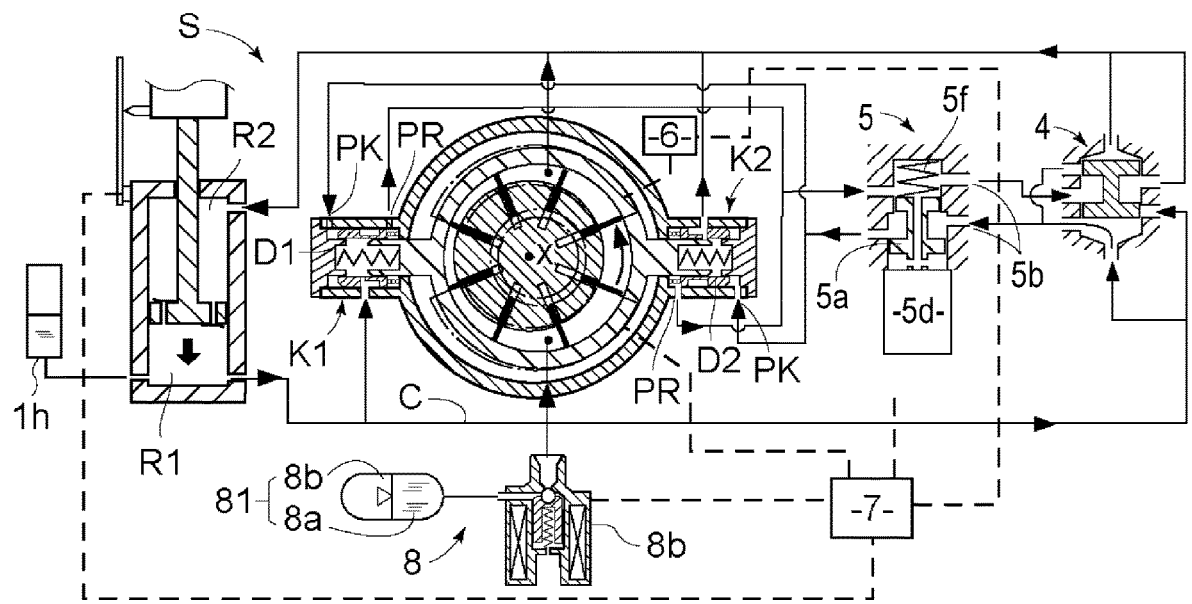
FIG. 22 is a description view illustrating a configuration of a shock absorber according to an eleventh embodiment.

FIGS. 22 and 23 illustrate a configuration of the shock absorber S according to an eleventh embodiment. In the shock absorber S of this embodiment, the plunger 5a forming the valve 5 (third valve) can be configured to have two flange portions H having different areas.

Figure 23A:
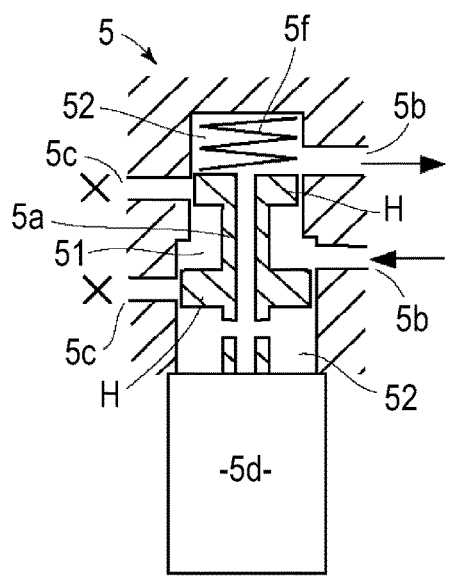
Figure 23B:
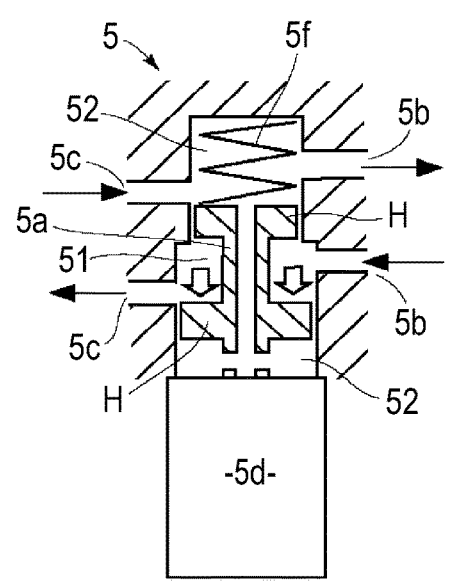

For example, as illustrated in FIGS. 23A and 23B, a plurality of circulation bores are provided in a wall portion of the valve 5 (third valve) having a tubular shape in which the plunger 5a reciprocates, and form two flow paths through which the fluid from the first fluid chamber R1 or the second fluid chamber R2 circulates. A coil spring as a plunger biasing portion 5f which biases the plunger 5a toward one side in the reciprocation is provided on one side of the plunger 5a. The coil spring biases the plunger 5a to push in the plunger 5a; however, due to a current applied to the solenoid portion 5d, a predetermined drive force is applied to the plunger 5a to stabilize the position of the plunger 5a.

In the example of FIGS. 23A and 23B, since the area of the flange portion H on a lower side is wide, and a high pressure of the fluid flows into the acceptance port 5b on the lower side via the valve 4 (switching valve), the plunger 5a is lowered. When no electric power is applied to the solenoid portion 5d, the valve 4 is in an open state.

Incidentally, a pressure to move the plunger 5a is as follows. A portion interposed between two flange portions H is a first valve chamber 51. Upper and lower portions connected to each other via the penetration flow path 5e of the plunger 5a are a second valve chamber 52. Since the area of the flange portion H on the lower side is wide, the plunger 5a is biased toward the lower side along with an increase in the pressure of the first valve chamber 51. Since an area to push upward the flange portion H on the lower side is wider than an area to push downward the flange portion H on an upper side, the plunger 5a is biased toward the upper side along with an increase in the pressure of the second valve chamber 52. Namely, depending on a magnitude relationship between biasing forces in an upward and downward direction, the direction to bias the plunger 5a is determined along with an increase or a decrease in pressure. The movement direction and the movement amount of the plunger 5a are determined by the sum of an electromagnetic force, an oil pressure force, and a spring force of the plunger biasing portion 5f.

If the valve 5 (third valve) with this configuration is used, the offset position of the outer ring member 2c1 is more accurately set. Specifically, the position of the plunger 5a is determined by a current applied to the valve 5 (third valve). As illustrated in FIG. 23A, for example, a position where the valve 5 (third valve) is not open is set as an initial position of the plunger 5a. Therefore, if a difference between fluid pressures applied to the first valve chamber 51 and the second valve chamber 52 reaches a predetermined value, the plunger 5a moves to the open position against the electromagnetic force of the plunger 5a due to the pressure, and if the fluid pressure is high, as illustrated in FIG. 23B, the open amount of the valve 5 (third valve) increases. The valve 4 (switching valve) normally supplies a high pressure of the fluid to the acceptance port 50 on the lower side between the acceptance ports 5b of the valve 5 (third valve). The fluid is supplied to the stopper ports PK of the first sleeve D1 and the second sleeve D2 via the valve 4. Accordingly, the positions of the first sleeve D1 and the second sleeve D2 are determined.

Namely, the open fluid pressure of the valve 5 (third valve) is determined and the positions of the first sleeve D1 and the second sleeve D2 are determined by a set current of the valve 5 (third valve). Since the valve 5 (third valve) with this configuration is used, even though the amount of offset of the outer ring member 2c1 is not measured with particular detection means, a theoretical discharge amount of the pump 2 is determined only by setting an application current of the valve 5 (third valve). Therefore, it is possible to set the flow rate of the pump 2 in response to an operation state of the suspension, for example, when the vehicle travels on a road surface where upthrust from the ground is severe, and it is possible to appropriately set the damping force or the regeneration effect of the shock absorber S.

Figure 24A:
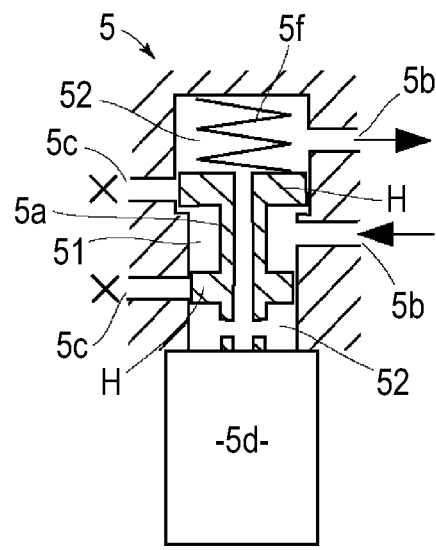
FIGS. 24A and 24B are description views illustrating another configuration of the oil control valve according to the eleventh embodiment.
Figure 24B:
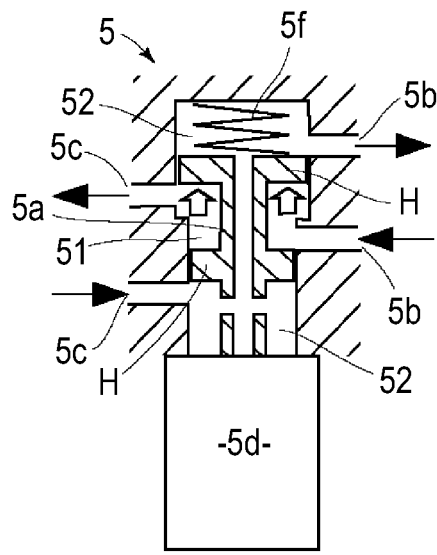

Incidentally, the valve 5 (third valve) may be a valve illustrated in FIGS. 24A and 248. The valve 5 (third valve) has a size relationship between two flange portions H which is opposite to that illustrated in FIGS. 23A and 238. With this configuration, when no current is applied to the solenoid portion 5d, the valve 5 (third valve) is closed as illustrated in FIG. 24A.

In addition, with this configuration, if the pressure of the fluid flowing into the valve 5 (third valve) increases, the plunger 5a rises as illustrated in FIG. 248; however, at this time, a biasing spring inside the valve 5 (third valve) is contracted to increase a biasing force. Therefore, with this configuration, even though the fluid pressure increases, an increase in the open amount of the valve 5 (third valve) is prevented, and the movement amounts of the first sleeve D1 and the second sleeve D2 are reduced, and thus the outer ring member 2c1 is capable of having a relatively large amount of offset. As described above, according to the valve 5 (third valve) with this configuration, compared to the case where the valve 5 (third valve) of FIG. 14 is used, the damping effect of the shock absorber S becomes more moderate.

Twelfth Embodiment

Figure 25:
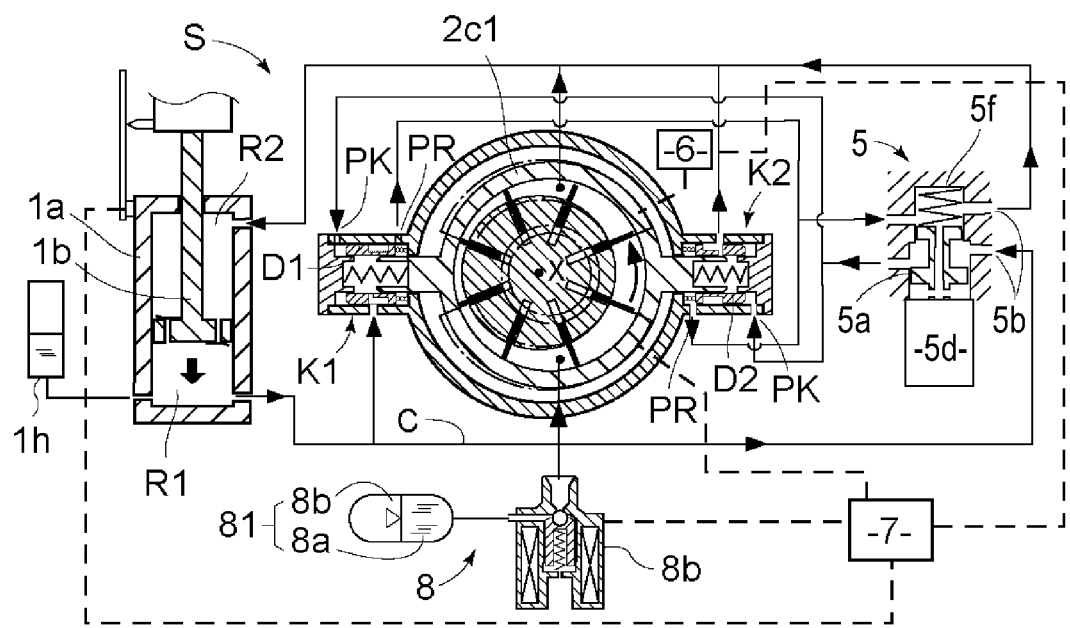
FIG. 25 is a description view illustrating a configuration of a shock absorber according to a twelfth embodiment.

FIG. 25 illustrates a configuration of the shock absorber S according to a twelfth embodiment. This configuration is acquired by eliminating the valve 4 (switching valve) from the configuration of FIG. 13.

When the vehicle travels, the inflow and discharge of the fluid at the first fluid chamber R1 and the second fluid chamber R2 alternate in alignment with extension and contraction operations of the suspension. In order to enhance the damping effect of the suspension, preferably, the amount of offset of the outer ring member 2c1 is restricted so as to dampen both of the extension and contraction operations, for example, both when the fluid is discharged from the first fluid chamber R1 and when the fluid is discharged from the second fluid chamber R2.

However, the cycle of upward and downward movements of the vehicle body is much different from a cycle where the piston 1b of the suspension reciprocates upward and downward. Namely, the piston 1b moves upward and downward while repeating very small upward and downward movements; however, the cycle of upward and downward movements of the vehicle body is more moderate compared to that of very small upward and downward movements of the suspension. Attentions are paid to this point, and thus with this configuration, for example, only one side operation between the upward and downward movements of the piston 1b is dampened.

For example, in the example illustrated in FIG. 25, when the pressure of the fluid in the first fluid chamber R1 becomes high, the fluid is supplied to the stopper ports PK of the first sleeve D1 and the second sleeve D2. Namely, when the wheel is thrusted upward, an increase in the amount of offset of the outer ring member 2c1 is prevented.

On the other hand, when due to a load to the wheel being eliminated, the piston 1b moves upward relative to the cylinder 1a and the fluid pressure of the second fluid chamber R2 becomes high, the fluid flows into the relief ports PR, so that the first sleeve D1 and the second sleeve D2 move outward and the offset of the outer ring member 2c1 is allowed to increase. However, in this case, preferably, the wheel quickly comes into contact with the ground. Therefore, an increase in the amount of offset of the outer ring member 2c1 is preferable since the number of rotations of the pump 2 increases and the piston 1b moves relatively rapidly.

As described above, according to the shock absorber S with this configuration. It is possible to substantially assure the damping effect of the suspension while simplifying the configuration.

The shock absorber disclosed here dampens the movement of the piston and generates a regenerative current by regulating the flow rate of the working oil, or operates the piston, and can be widely applied to, for example, a shock absorber or a vehicle height regulating mechanism of a vehicle.

Configuration

A feature of a shock absorber according to a first aspect of this disclosure (first configuration) resides in that the shock absorber includes a cylinder accommodating a fluid; a piston that reciprocates with respect to the cylinder while partitioning an inside of the cylinder into a first fluid chamber and a second fluid chamber; a pump having a first port that communicates with either one of the first fluid chamber and the second fluid chamber and a second port that communicates with the other one of the first fluid chamber and the second fluid chamber, and including a flow rate change portion that changes a circulation amount of the fluid circulating between the first port and the second port; an electric rotor rotating in conjunction with the pump; and a stator forming a magnetic field between the electric rotor and the stator.

Effects

If the shock absorber with this configuration is provided in, for example, a wheel of a vehicle and the first fluid chamber is compressed while the vehicle travels, the fluid in the first fluid chamber circulates from the first port to the second port (or from the second port to the first port) of the pump to drive the pump. As described above, since the fluid held by the shock absorber is used, as it is, to drive the pump, only a flow path of the fluid can be provided between the shock absorber and the pump, and it is possible to make the configuration of the apparatus very compact.

In addition, since the pump driven by the fluid is used, there is no concern such as the occurrence of a back lash that is likely to occur in a transmission mechanism using a screw member and the like, and it is possible to demonstrate a smooth and highly responsive cushioning effect.

Furthermore, with this configuration, since the flow rate change portion is operated by the pressure of the fluid in the first fluid chamber and the second fluid chamber, it is not necessary to separately prepare an electric drive portion, and it is possible to simplify the structure of the apparatus.

Configuration

It is advantageous that the shock absorber according to the first configuration further includes a first valve connected to the first fluid chamber and the second fluid chamber and having a high pressure port and a low pressure port, in which one having a high fluid pressure between the first fluid chamber and the second fluid chamber is switched to communicate with the high pressure port and one having a low fluid pressure is switched to communicate with the low pressure port by a valve body provided in the first valve, in which the pump has a fluid rotor holding a plurality of vanes, and a ring member with which the vanes come into contact, the flow rate change portion has a first pressure chamber that applies the fluid pressure of the low pressure port to the ring member so as to increase the circulation amount, and a second pressure chamber that applies the fluid pressure of the high pressure port to the ring member so as to reduce the circulation amount, and the ring member is reciprocatable in a direction perpendicular to a rotation axis of the fluid rotor by a biasing portion that biases the ring member along a direction of application of the fluid pressure by the first pressure chamber.

Effects

The pump with this configuration is a vane pump, and it is possible to change the flow rate of the pump by moving the ring member with respect to the rotation axis of the fluid rotor. For example, if the first fluid chamber is compressed and the pressure of the first fluid chamber increases, the fluid flows into the vane pump from the first port and circulates to the second port. At this time, a high pressure of the fluid in the first fluid chamber flows into the second pressure chamber to press the ring member.

The ring member is normally biased in a predetermined direction with respect to the rotation axis of the fluid rotor by the biasing portion. The biasing direction is a direction where the circulation amount of the vane pump increases, namely, the amount of offset of a center of the ring member with respect to the rotation axis of the fluid rotor becomes large.

As the result of the fluid in the first fluid chamber flowing into the second pressure chamber at this state, the amount of offset is reduced, and the amount of the fluid circulating through the vane pump is reduced. Namely, there occurs resistance to the movement of the piston, and the cushioning effect is demonstrated.

The vane pump described above can be small, and the entirety of the apparatus becomes compact, and the ease of mounting to various apparatuses improves.

Furthermore, since the configuration where the fluid rotor and the electric rotor rotate in conjunction with each other is very simple, it is possible to prevent an increase in the manufacturing cost of the apparatus with no increase in the size of the apparatus.

Configuration

It is advantageous that the shock absorber according to the first configuration further includes a second valve that changes and controls a cross-sectional area and a communication destination of a flow path through which the high pressure port and the low pressure port communicate with the second pressure chamber and the first pressure chamber.

Effects

Since the second valve with this configuration is provided, it s possible to regulate the pressures of the first pressure chamber and the second pressure chamber independently from the operation of the shock absorber. Namely it is possible to regulate the amount of the fluid circulating through the vane pump when the shock absorber operates. This implies that it is possible to randomly regulate the number of rotations of the fluid rotor in a regenerative operation, and it is possible to randomly regulate the circulation amount of the fluid in a power running operation.

Therefore, it is possible to randomly set the regeneration efficiency or an extension state of the shock absorber.

Configuration

A feature of the shock absorber according to a second aspect of this disclosure (second configuration) resides in that, in addition to the first configuration, the flow rate change portion changes the circulation amount of the fluid in response to a pressure difference between a pressure of the first fluid chamber and a pressure of the second fluid chamber, and the pump has a rotation member that circulates the fluid across the first port and the second port, and a rotational direction setting portion that makes a rotational direction of the rotation member constant regardless of the pressure difference.

Effects

According to the shock absorber with this configuration, since the rotational direction of the rotation member is maintained constant regardless of the pressure difference between the fluids in the first fluid chamber and the second fluid chamber, a kinetic energy loss related to the rotational inertia of the rotation member, which is caused when the rotational direction of the rotation member is changed, is reduced. Therefore, it is possible to improve the regenerative operation efficiency when the pump is used as a fluid pressure motor, or the power running operation efficiency when the pump is used as a fluid pressure pump.

Configuration

In the shock absorber according to the second configuration, it is advantageous that the pump includes a fluid rotor serving as the rotation member and holding a plurality of vanes, and a ring member that is reciprocatable in a direction perpendicular to a rotation axis of the fluid rotor while the vanes are in contact therewith and has a biasing portion that brings a center of the ring member close to the rotation axis of the fluid rotor, a first pressure chamber which applies a fluid pressure of the first fluid chamber to the ring member and a second pressure chamber which applies a fluid pressure of the second fluid chamber to the ring member are formed on an outer peripheral surface of the ring member at positions opposite to each other, the flow rate change portion is formed by changing an amount of offset between the fluid rotor and the ring member, and the rotational direction setting portion is formed by changing an offset direction of the ring member with respect to the fluid rotor Effects The pump with this configuration is a vane pump, and the amount of offset between the fluid rotor and the ring member is changed in response to the pressure difference between the fluid pressure of the first fluid chamber and the fluid pressure of the second fluid chamber. For example, when the fluid pressure of the first fluid chamber is higher than the fluid pressure of the second fluid chamber, the fluid in the first fluid chamber flows into the first pressure chamber, and the fluid in the second pressure chamber is pushed out to return to the second fluid chamber. Accordingly, the amount of offset of the ring member with respect to the fluid rotor increases, and the volume of each pump chamber, which is formed between the fluid rotor and the ring member along the rotational direction of the fluid rotor, is changed.

At this time, if the amount of offset becomes large, with regard to the volume of each pump chamber communicating with a port to which the fluid is supplied, the amount of change in response to the rotation of the fluid rotor becomes large. In this case, due to the characteristics of the vane pump, the circulation amount of the fluid is set to be large. If the amount of offset of the ring member is changed as described above, the circulation amount of the vane pump is set and the circulation resistance of the fluid s changed, so that the cushioning function of the shock absorber is appropriately set. With this configuration, the flow rate change portion is formed by changing the position of the ring member.

In addition, the rotational direction of the fluid rotor is set so as to increase the volume of each pump chamber, which communicates with a port to which the fluid is supplied, in response to the rotation of the fluid rotor. For example, if the pressure of the first fluid chamber increases, the fluid in the first fluid chamber circulates from the first port to the second port. At this time, the fluid in the first fluid chamber flows into the first pressure chamber to displace the ring member in one direction. Accordingly, the fluid rotor rotates to increase the volume of a pump chamber positioned downstream in the rotational direction of the fluid rotor, with regard to the volume of each pump chamber where the first port opens.

On the other hand, if the pressure of the second fluid chamber increases, the fluid in the second fluid chamber flows into the second pressure chamber to displace the ring member in a direction opposite to one direction described above. Accordingly, the rotational direction of the fluid rotor is determined in response to a change in the volume of a pump chamber where the second port opens, and eventually, the rotational direction is the same as the direction described above. As described above, with this configuration, the rotational direction setting portion is formed by changing the position of the ring member.

As described above, with this configuration, when the cushioning function of the shock absorber is activated, and when regeneration is performed using a flow of the fluid, the rotational direction of the fluid rotor is constant regardless of an operation state of the shock absorber. Therefore, the cushioning function and the regenerative function are smoothly demonstrated.

In addition, also in the power running operation where the fluid rotor is rotated by a rotary armature, namely, the vane pump is used as a fluid pressure pump, the rotational direction of the fluid rotor is constant regardless of a discharge direction of the fluid. For example, if the fluid is discharged from the second port, the pressure of the second port increases. Therefore, the pressures of the second fluid chamber and the second pressure chamber which communicate with the second port increase, and the ring member displaces in one direction with respect to the rotation axis of the fluid rotor. As a result, the fluid rotor rotates such that the further a pump chamber where the first port on a supply side opens moves downstream in the rotational direction, the larger the volume of the pump chamber becomes.

Conversely if the fluid is discharged from the first port, the pressures of the first port, the first fluid chamber, and the first pressure chamber increase, and the ring member displaces in a direction reverse to one direction described above with respect to the rotation axis of the fluid rotor. Also at this time, the fluid rotor rotates such that the further a pump chamber where the second port on the supply side opens moves downstream in the rotational direction, the larger the volume of the pump chamber becomes. Namely, the fluid rotor rotates in the same direction as that described above.

As described above, with this configuration, also when power running is performed on the shock absorber, the rotational direction of the fluid rotor is constant regardless of an operation direction of the shock absorber. Therefore, the regulation of an extension state of the shock absorber is smoothly demonstrated.

Configuration

It is advantageous that the shock absorber according to the second configuration further includes a third valve that changes and controls a cross-sectional area and a communication destination of a flow path through which the first fluid chamber and the second fluid chamber communicate with the first pressure chamber and the second pressure chamber.

Effects

Since the valve with this configuration is provided, it is possible to regulate the pressures of the first pressure chamber and the second pressure chamber independently from the operation of the shock absorber. Namely, it is possible to regulate the amount of the fluid circulating through the vane pump by regulating the amount of offset between the fluid rotor and the ring member when the shock absorber operates. This implies that it is possible to randomly regulate the number of rotations of the fluid rotor in the regenerative operation, and it is possible to randomly regulate the circulation amount of the fluid in the power running operation. Therefore, it is possible to randomly set the regeneration efficiency or the extension state of the shock absorber.

Configuration

In the shock absorber according to the second configuration, it is advantageous that the ring member has a first guide protrusion that reciprocates inside the first pressure chamber, and a second guide protrusion that reciprocates inside the second pressure chamber, the first pressure chamber is provided with a first stopper portion that moves relative to the first guide protrusion to restrict a movement amount of the reciprocation of the first guide protrusion inside the first pressure chamber, and the second pressure chamber is provided with a second stopper portion that moves relative to the second guide protrusion to restrict a movement amount of the reciprocation of the second guide protrusion inside the second pressure chamber Effects Since the first stopper portion and the second stopper portion restrict the amount of offset of the ring member from the rotation axis, a change in the volumes of vane chambers formed by the vanes of the fluid rotor is reduced. For this reason, particularly if the piston of the shock absorber moves rapidly, since the cross section of the flow path of the pump is prevented from being enlarged, the movement of the piston is limited, and interference effect of the shock absorber is enhanced.

On the other hand, as the piston moves, the rotational speed of the fluid rotor increases so as to circulate a predetermined amount of the fluid, and thus, for example, a generated electric power increases.

As described above, with this configuration, it is possible to acquire a shock absorber that provides more enhanced damping effect and regeneration efficiency.

Configuration

In the shock absorber according to the second configuration, it is advantageous that the first stopper portion includes a stopper portion that is slidable with respect to a portion of an inner wall of the first pressure chamber and the first guide protrusion and prevents a movement of the first guide protrusion, and changes a position thereof with a fluid from the first fluid chamber or the second fluid chamber so that a movement range of the first guide protrusion is regulatable, and the second stopper portion includes a stopper portion that is slidable with respect to a portion of an inner wall of the second pressure chamber and the second guide protrusion and prevents a movement of the second guide protrusion, and changes a position thereof with a fluid from the first fluid chamber or the second fluid chamber so that a movement range of the second guide protrusion is regulatable.

Effects

With this configuration, for example, the position of the first stopper portion which regulates the movement range of the first guide protrusion is changed by the fluid from the cylinder. Since an inflow and discharge state of the fluid is changed in response to the speed of movement of the piston with respect to the cylinder, the position of the first stopper portion is determined to be a position in response to a movement state of the piston. Accordingly, the movement range of the first guide protrusion is restricted, namely, the displacement amount of the ring member is determined in response to the movement state of the piston. If the displacement amount of the ring member is changed, the interference function and the regeneration efficiency of the shock absorber are changed.

As described above, with this configuration, it is possible to set the function of the shock absorber in response to a circulation state of the fluid from the cylinder, and it is possible to acquire a reasonable shock absorber without using complex control software or the like.

Configuration

In the shock absorber with the second configuration, it is advantageous that the third valve has a tubular shape, includes a plunger that reciprocates inside the third valve and has a plurality of flange portions whose surfaces perpendicular to a direction of the reciprocation have different areas, a plurality of circulation bores that are provided in a wall portion of the third valve and form two flow paths through which the fluid from the first fluid chamber or the second fluid chamber circulates inside the third valve, a solenoid portion that causes the plunger to reciprocate, and a plunger biasing portion that biases the plunger toward one side in the reciprocation, and is configured to cause the plunger to reciprocate based on a pressure difference between the fluids flowing into the two flow paths, and to synchronously increase and decrease circulation amounts of the fluids in the two flow paths in response to a movement of the plunger in a partial region of a reciprocation region of the plunger.

Effects

The valve with this configuration balances the position of the plunger with a biasing force of the plunger biasing portion and a drive force of the solenoid portion, and moves the plunger in either one direction in response to the pressure difference between the fluids flowing into the two flow paths. It is possible to randomly set the balanced position of the plunger in response to an application current to the solenoid portion.

The value of an increase in pressure required to open the valve is determined by the set position of the plunger. If the required pressure value is large, for example, when the piston of the shock absorber moves to cause a difference between the pressure of the first fluid chamber and the pressure of the second fluid chamber, since it takes time for the pressure difference to reach a predetermined value, the valve opens tardily. Therefore, the revelation of the restriction effect of the first stopper portion and the second stopper portion is delayed, the damping effect of the shock absorber becomes moderate, and also the regeneration efficiency is reduced. On the other hand, if the required pressure value is small, the valve opens early, and the damping effect and the regeneration efficiency of the shock absorber are enhanced.

As described above, since the valve with this configuration is provided, it is possible to determine the effect of the shock absorber, and to more accurately acquire the damping effect or the regeneration efficiency by the setting of the application current to the valve.

Configuration

It is advantageous that the shock absorber according to any of the first and second configurations further includes a pressure regulating portion that regulates a pressure of the fluid.

Effects

If the shock absorber includes the piston and the cylinder, the rod extends from the piston. For this reason, the area of a portion of the piston which faces the first fluid chamber is different from the area of a portion which faces the second fluid chamber. Namely, there occurs a difference between fluid pressures which are applied in directions opposite to each other while the piston is interposed therebetween. However, for example, the weight of the vehicle in which the shock absorber s installed and the like is applied to a small fluid pressure side, and thus both pressures applied to the piston become equal, and the position of the piston is fixed.

Then, since the pressure regulating portion with this configuration is provided, a difference between fluid pressures which are opposite to each other while the piston is interposed therebetween is changed by changing the entire pressure of the fluid accommodated in the shock absorber. Accordingly, the position of the piston is changed, namely, it is possible to appropriately change an initial vehicle height or the like of the vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A shock absorber comprising:
  a cylinder accommodating a fluid;
  a piston that reciprocates with respect to the cylinder while partitioning an inside of the cylinder into a first fluid chamber and a second fluid chamber;
  a pump having a first port that communicates with one of the first fluid chamber and the second fluid chamber and a second port that communicates with the other one of the first fluid chamber and the second fluid chamber, and including a flow rate change portion that changes a circulation amount of the fluid circulating between the first port and the second port;
  an electric rotor rotating in conjunction with the pump;
  a stator forming a magnetic field between the electric rotor and the stator;
  a first valve connected to the first fluid chamber and the second fluid chamber and having a high pressure port and a low pressure port, in which one of the first fluid chamber and the second fluid chamber having a higher fluid pressure than the other one of the first fluid chamber and the second fluid chamber is switched to communicate with the high pressure port and the other one of the first fluid chamber and the second fluid chamber is switched to communicate with the low pressure port by a valve body provided in the first valve, wherein the pump has a fluid rotor holding a plurality of vanes, and a ring member with which the vanes come into contact, the flow rate change portion has a first pressure chamber that applies the fluid pressure of the low pressure port to the ring member so as to increase the circulation amount, and a second pressure chamber that applies the fluid pressure of the high pressure port to the ring member so as to reduce the circulation amount, by flow paths different from flow paths by which the first and second fluid chambers communicate with the first and second ports, and the ring member is reciprocatable in a direction perpendicular to a rotation axis of the fluid rotor by a biasing portion that biases the ring member along a direction of application of the fluid pressure by the first pressure chamber.

2. The shock absorber according to claim 1, further comprising:
a second valve that changes and controls a cross-sectional area and a communication destination of the flow paths through which the high pressure port and the low pressure port communicate with the second pressure chamber and the first pressure chamber.

3. The shock absorber according to claim 1, wherein the pump has
a rotational direction setting portion that makes a rotational direction of the fluid rotor constant regardless of the pressure difference.

4. The shock absorber according to claim 3, wherein the biasing portion is configured to bring a center of the ring member close to the rotation axis of the fluid rotor, the first pressure chamber and the second pressure chamber are formed on an outer peripheral surface of the ring member at positions opposite to each other,
the flow rate change portion is formed by changing an amount of offset between the fluid rotor and the ring member, and
the rotational direction setting portion is formed by changing an offset direction of the ring member with respect to the fluid rotor.

5. The shock absorber according to claim 4, further comprising:
a third valve that changes and controls a cross-sectional area and a communication destination of the flow paths through which the first fluid chamber and the second fluid chamber communicate with the first pressure chamber and the second pressure chamber.

6. The shock absorber according to claim 4, wherein the ring member has a first guide protrusion that reciprocates inside the first pressure chamber, and a second guide protrusion that reciprocates inside the second pressure chamber, the first pressure chamber is provided with a first stopper portion that moves relative to the first guide protrusion to restrict a movement amount of the reciprocation of the first guide protrusion inside the first pressure chamber, and the second pressure chamber is provided with a second stopper portion that moves relative to the second guide protrusion to restrict a movement amount of the reciprocation of the second guide protrusion inside the second pressure chamber.

7. The shock absorber according to claim 6, wherein the first stopper portion includes a stopper portion that is slidable with respect to a portion of an inner wall of the first pressure chamber and the first guide protrusion and prevents a movement of the first guide protrusion, and changes a position thereof with a fluid from the first fluid chamber or the second fluid chamber so that a movement range of the first guide protrusion is regulatable, and the second stopper portion includes a stopper portion that is slidable with respect to a portion of an inner wall of the second pressure chamber and the second guide protrusion and prevents a movement of the second guide protrusion, and changes a position thereof with a fluid from the first fluid chamber or the second fluid chamber so that a movement range of the second guide protrusion is regulatable.

8. A shock absorber according to claim 5, wherein the third valve
has a tubular shape,
includes a plunger that reciprocates inside the third valve and has a plurality of flange portions whose surfaces perpendicular to a direction of the reciprocation have different areas,
a plurality of circulation bores that are provided in a wall portion of the third valve and form two flow paths through which the fluid from the first fluid chamber or the second fluid chamber circulates inside the third valve,
a solenoid portion that causes the plunger to reciprocate, and
a plunger biasing portion that biases the plunger toward one side in the reciprocation, and
is configured to cause the plunger to reciprocate based on a pressure difference between the fluids flowing into the two flow paths, and to synchronously increase and decrease circulation amounts of the fluids in the two flow paths in response to a movement of the plunger in a partial region of a reciprocation region of the plunger.

9. The shock absorber according to claim 4, further comprising:
a pressure regulating portion that regulates a pressure of the fluid.

* * * * *